(12) United States Patent
Linder et al.

(10) Patent No.: US 8,717,412 B2
(45) Date of Patent: May 6, 2014

(54) PANORAMIC IMAGE PRODUCTION

(75) Inventors: Natan Linder, Motza Illit (IL); Eli Ben-Ami, Herzlia (IL); Adar Shtainhart, Kibbutz Glil-Yam (IL); Israel Distanik, Bat-Hefer (IL); Ehud Lavsky, Herzlia (IL); Noam Sorek, Zikhron-Yaakov (IL); Orna Bregman-Amitai, Tel-Aviv (IL); Lilach Armony-Shimoni, Haifa (IL); Tom Shenhav, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1458 days.

(21) Appl. No.: 11/826,767

(22) Filed: Jul. 18, 2007

(65) Prior Publication Data

US 2009/0021576 A1 Jan. 22, 2009

(51) Int. Cl.
*H04N 7/00* (2011.01)

(52) U.S. Cl.
USPC ............... 348/36; 348/37; 348/39; 348/222.1

(58) Field of Classification Search
USPC .................................... 348/36, 37, 39, 222.1
See application file for complete search history.

(56) References Cited

U.S. PATENT DOCUMENTS

| | | | |
|---|---|---|---|
| 5,858,400 A | 1/1999 | Williams | |
| 5,907,626 A | 5/1999 | Toklu et al. | |
| 5,999,662 A | 12/1999 | Burt et al. | |
| 6,075,905 A | 6/2000 | Herman et al. | |
| 6,304,284 B1 * | 10/2001 | Dunton et al. | 348/36 |
| 6,393,163 B1 | 5/2002 | Burt et al. | |
| 6,699,231 B1 | 3/2004 | Sterman et al. | |
| 6,717,608 B1 * | 4/2004 | Mancuso et al. | 348/36 |
| 6,798,923 B1 | 9/2004 | Hsieh et al. | |
| 6,865,028 B2 | 3/2005 | Moustier et al. | |
| 7,558,618 B1 | 7/2009 | Williams | |
| 7,596,242 B2 | 9/2009 | Breed et al. | |
| 7,599,566 B2 | 10/2009 | Silverstein et al. | |
| 7,653,264 B2 | 1/2010 | Hero et al. | |
| 7,688,346 B2 * | 3/2010 | Richards | 348/36 |
| 2001/0028798 A1 * | 10/2001 | Manowitz et al. | 396/429 |
| 2002/0107504 A1 | 8/2002 | Gordon | |
| 2002/0181802 A1 | 12/2002 | Peterson | |
| 2004/0130626 A1 | 7/2004 | Ouchi et al. | |
| 2004/0189849 A1 | 9/2004 | Hofer | |

(Continued)

FOREIGN PATENT DOCUMENTS

| | | |
|---|---|---|
| EP | 1613060 | 1/2006 |
| KR | 0286306 | 1/2001 |

(Continued)

OTHER PUBLICATIONS

European Search Report and the European Search Opinion Dated Feb. 12, 2010 From the European Patent Office Re.: Application No. 08160444.9.

(Continued)

*Primary Examiner* — Oanh Duong

(57) ABSTRACT

A method of assembling a panoramic image from a plurality of frames in a camera, the method comprising: (a) acquiring a video stream using a camera; (b) selecting an initial frame from the video stream for capture as a still image; (c) further selecting additional frames; and (d) stitching the additional frames to the initial frame in the camera to create a panoramic image.

20 Claims, 10 Drawing Sheets

(56) References Cited

U.S. PATENT DOCUMENTS

| | | | |
|---|---|---|---|
| 2004/0228544 | A1 | 11/2004 | Endo et al. |
| 2005/0008254 | A1 | 1/2005 | Ouchi et al. |
| 2005/0022139 | A1 | 1/2005 | Gettman et al. |
| 2005/0200706 | A1 | 9/2005 | Ouchi |
| 2005/0231602 | A1* | 10/2005 | Obrador et al. .......... 348/208.14 |
| 2006/0018547 | A1 | 1/2006 | Ouchi |
| 2006/0062487 | A1 | 3/2006 | Ouchi |
| 2006/0062564 | A1 | 3/2006 | Dalton et al. |
| 2006/0171687 | A1* | 8/2006 | Aiso ............................ 386/120 |
| 2006/0181619 | A1 | 8/2006 | Liow et al. |
| 2006/0190022 | A1 | 8/2006 | Beyar et al. |
| 2007/0025723 | A1 | 2/2007 | Baudisch et al. |
| 2007/0041058 | A1 | 2/2007 | Disatnik et al. |
| 2007/0041616 | A1 | 2/2007 | Lee et al. |
| 2007/0081081 | A1 | 4/2007 | Cheng |
| 2007/0159527 | A1 | 7/2007 | Kim et al. |
| 2009/0022422 | A1 | 1/2009 | Sorek et al. |

FOREIGN PATENT DOCUMENTS

| | | |
|---|---|---|
| KR | 2006-0006186 | 1/2006 |
| WO | WO 99/51027 | 10/1999 |
| WO | WO 2005/041564 | 5/2005 |
| WO | WO 2005/084400 | 9/2005 |
| WO | WO 2006/006169 | 1/2006 |
| WO | WO 2006/114783 | 11/2006 |
| WO | WO 2006/122189 | 11/2006 |

OTHER PUBLICATIONS international Search Report Dated Jul. 12, 2006 From the International Searching Authority Re.: Application No. PCT/IL05/00749.
Written Opinion Dated Jul. 12, 2006 From the International Searching Authority Re.: Application No. PCT/IL05/00749.
Szeliski "Image Alignment and Stitching: A Tutorial", Technical Report, Preliminary Draft, Will Appear in: Mathematical Models of Computer Vision: The Handbook, 59 P., 2004.
European Search Report Dated Mar. 23, 2010 From the European Patent Office Re.: Application No. 08160270.8.
Official Action Dated Jan. 3, 2011 From the US Patent and Trademark Office Re. U.S. Appl. No. 11/826,772.
Partial European Search Report Dated Jan. 28, 2010 From the European Search Authority Re.: Application No. 081601270.8
Response Dated Jan. 24, 2011 to Official Action of Jan. 3, 2011 From the US Patent and Trademark Ofifce Re. U.S. Appl. No. 11/826,772.
Official Action Dated Apr. 4, 2011 From the US Patent and Trademark Office Re. U.S. Appl. No. 11/826,772.

* cited by examiner

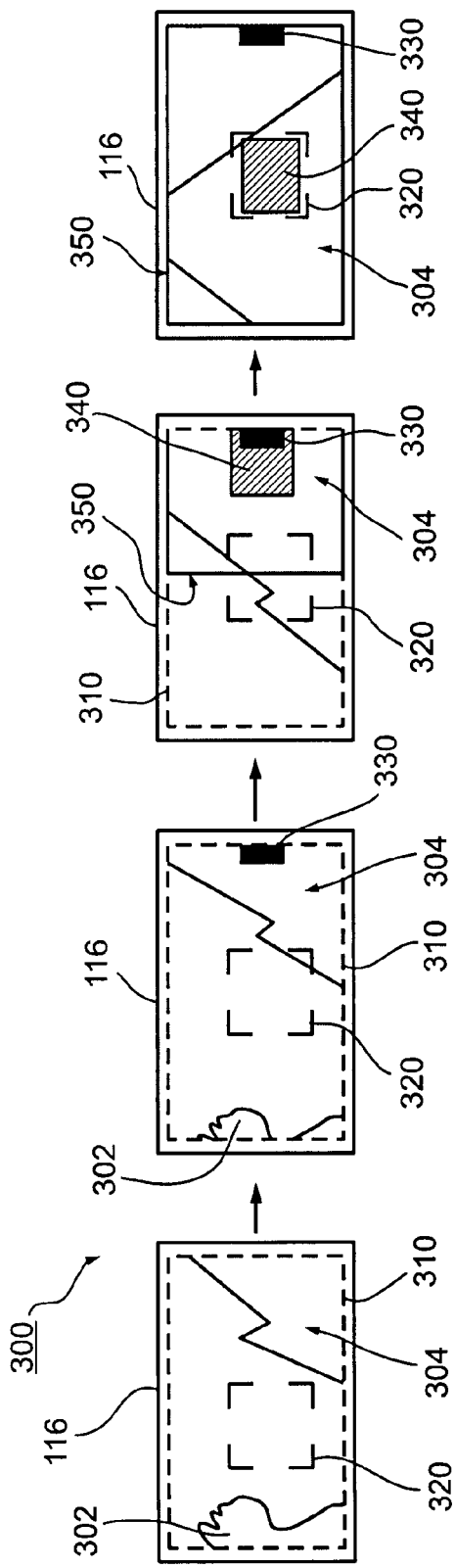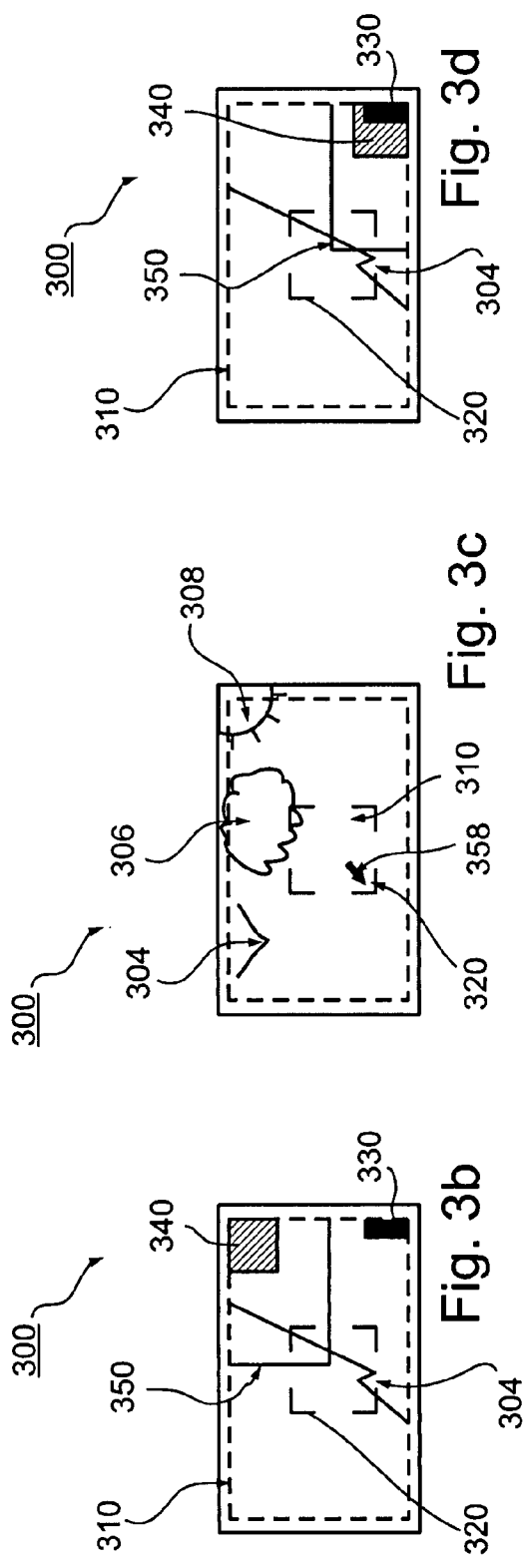

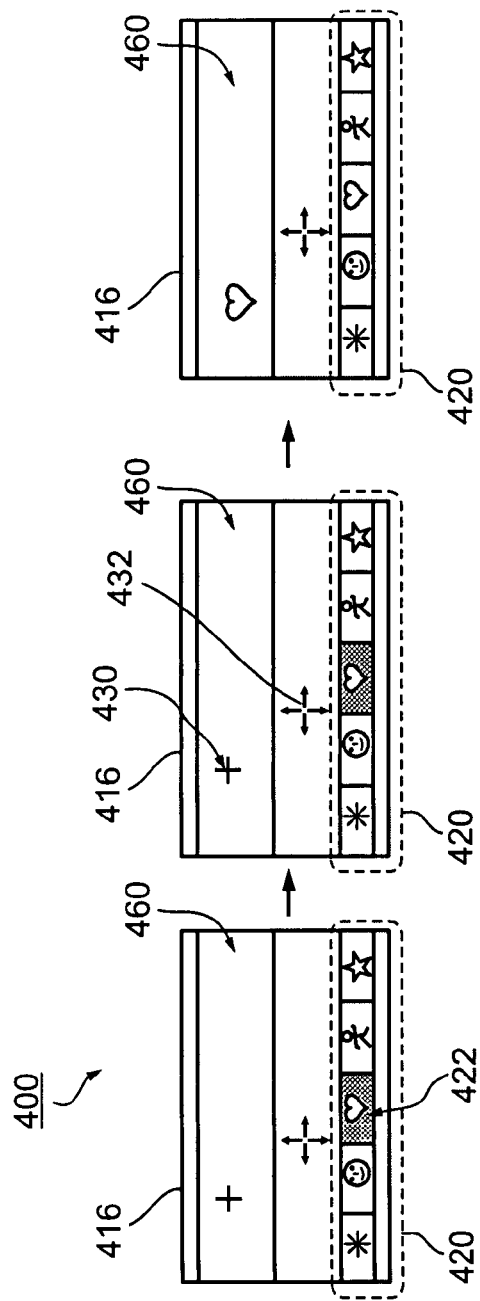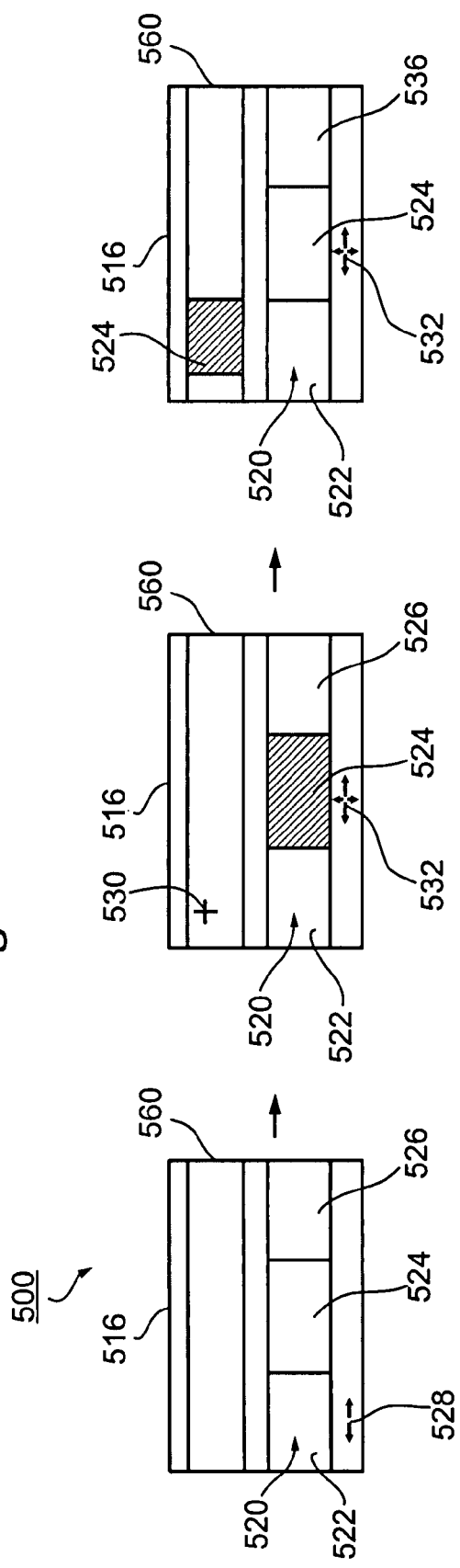

900

| 1 | 2 | 3 |
|---|---|---|
| 4 | 5 | 6 |
| 7 | 8 | 9 |

| 5 | 4 | 3 |
|---|---|---|
| 6 | 1 | 2 |
| 7 | 8 | 9 |

| 1 | 2 | 3 |
|---|---|---|
| 6 | 5 | 4 |
| 7 | 8 | 9 |

| 1 | 8 | 7 |
|---|---|---|
| 2 | 9 | 6 |
| 3 | 4 | 5 |

Fig. 9d

PANORAMIC IMAGE PRODUCTION

RELATED APPLICATION

This application is related to a co-pending application Ser. No. 11/826,772, entitled "METHOD FOR CONSTRUCTING A COMPOSITE IMAGE" by Noam SOREK and Orna BREGMAN-AMITAI

FIELD OF THE INVENTION

The present invention relates to production of panoramic images, for example using a camera installed in a mobile phone handset.

BACKGROUND OF THE INVENTION

Digital cameras with panoramic photography capabilities are commercially available. Mobile telephones with built in digital cameras are also commercially available. Typically, editing and/or manipulation solutions for panoramic images are performed on a separate computing device not incorporated into the camera or phone handset.

In general, panoramic photography refers to production of photographic images with exceptionally wide fields of view. Panoramic images typically capture a field of view comparable to, or greater than, that of the human eye, about 160° by 75°. Maintenance of detail across the entire picture contributes to a perceived image quality. Panoramic indicates that the image offers an unobstructed or complete view of an area. In many cases, panoramic images are presented as a wide strip.

Production of a panoramic image often involves capturing overlapping photographic frames and matching, or "stitching" the frames together at their overlapping edges.

The following patents and applications are generally indicative of current panoramic technology in "stand alone" cameras. The list does not purport to be exhaustive.

U.S. Pat. No. 5,138,460 by Egawa describes an apparatus for forming composite images. Egawa's apparatus includes a display device for displaying an image to be photographed such as a portion of an object, a memory device for storing data concerning an image which has been already photographed such as a previously photographed portion of the object, and a control device for enabling the display device to substantially simultaneously display both the image to be photographed and the image already photographed and stored as data in the memory device. The disclosure of this patent is fully incorporated herein by reference.

U.S. Pat. No. 5,907,626 to Toklu et al describes method for motion tracking and constructing a mosaic of video objects as well as a method for synthetic object transfiguration from a mosaic. According to Toklu, a 2-D triangular mesh is employed to represent a video object, which permits to describe the motion of the object by the displacements of the node points of the mesh, and to describe any intensity variations by the contrast and brightness parameters estimated for each node point. Using a temporal history of the node point locations, the nodes of the 2-D mesh are tracked even when they become invisible because of self-occlusion or occlusion by another object. By adding new nodes or updating the 2-D triangular mesh, any uncovered parts of the video object are incrementally added to the mosaic. A finite number of views representing the constructed mosaic are selected and used for synthetic transfiguration of a replacement object in place of the original one. The disclosure of this patent is fully incorporated herein by reference.

U.S. Pat. Nos. 5,999,662 and 6,393,163 to Burt et al. each describe a system for automatically generating a mosaic from a plurality of input images. The system sequentially executes an image alignment process, an editing process, and a combining process such that, from a sequence of images, the system automatically produces a seamless mosaic for various applications. The mosaic based display system permits a system user to display, manipulate and alter a mosaic. The mosaic based compression system exploits the temporal and spatial redundancy in image sequences and efficiently compresses the image information. The compression system can be used for compressing image information for storage in a storage device or can be used for compressing image information for transmission through a band-limited transmission channel. The disclosures of these patents are fully incorporated herein by reference.

United States Patent Application 20040189849 by Hofer describes a panoramic sequence guide that can be used to guide a user in composing and capturing images to be used to create a composite panoramic image. In use, the guide tracks a viewed scene, determines the proper position of a composition guide relative to the viewed scene, and displays a composition guide on a live-view screen that provides an indication of what portion of the viewed scene is to be captured. The displayed composition guide is fixed to the viewed scene such that the guide moves with the viewed scene in the screen. The disclosure of this application is fully incorporated herein by reference.

Korean patent 0286306 to Choi describes a method of panoramic photography which uses a digital still camera to easily connect pictures to construct a panoramic picture using an LCD monitor. The disclosure of this patent is fully incorporated herein by reference.

United States Patent Application 2004/0228544 by Takaaki et al. describes an image processing method and apparatus for generating a panoramic image in which the hue or brightness discontinuities generated at the seams of source images are reduced. Upon compositing source images having an overlap portion, the hue or brightness of each source image is converted using a reference image which has overlap portions with both the source images to be composited and the converted images are composited, thereby reducing the hue or brightness discontinuities generated at the seam of images. The disclosure of this application is fully incorporated herein by reference.

U.S. patent applications 2006/0062487, 2006/0018547, 2005/0200706, 2005/0008254 and 2004/0130626 by Ouchi et al. describe an image processing apparatus for generating graphics data representing a single seamless planar image synthesized from a multiple sets of graphics data contained in a plurality of graphics files which establishes a spheroidal or cylindrical projection plane for synthesis of the multiple sets of graphics data. The disclosure of each of these applications is fully incorporated herein by reference.

The following patents and applications are generally indicative of current panoramic technology in cameras "built in" to mobile phone handsets. The list does not purport to be exhaustive.

International application WO/2005/041564 by KONINKLIJKE PHILIPS ELECTRONICS N.V. describes a digital camera with panorama or mosaic functionality. The invention relates to an electronic device with a digital camera, and to a method of enabling to create a composite picture using a digital camera. In some embodiments, the electronic device is a mobile phone. The disclosure of this application is fully incorporated herein by reference.

United States Patent Application 20060181619 to Liow et al. describes a method for forming a panoramic image using a camera. According to Liow, a blending area is formed in a first image on a display of the camera. The camera is moved before being prepared to take a second photograph. In the blending area only, a pixel matching process is performed for determining an alignment of the portion of the first image in the blending area and part of a second image of the second photograph in the blending area. In some embodiments, the method is practiced using a camera in a mobile phone. The disclosure of this application is fully incorporated herein by reference.

There are commercially available panoramic picture technologies available for mobile phones. These technologies include, but are not necessarily limited to:

Scalado Autorama™ (Scalado AB; Sweden);
Vivid Panorama (Acrodea; Tokyo; Japan); and
PanoMan™ (Bit Side Technologies; Berlin; Germany).

Korean Patent 20060006186 to LG electronics describes taking a panoramic picture while transparently showing the part of the panoramic picture already taken.

SUMMARY OF THE INVENTION

An aspect of some embodiments of the invention relates to a user interface for acquisition of frames of a panoramic image. In an exemplary embodiment of the invention, the frames are acquired in sequential order.

In an exemplary embodiment of the invention, a border surrounds a first acquired image frame in a viewfinder. Optionally, the user selects an edge or corner of the border to indicate a motion direction to acquire the next image. Optionally, the user selects a motion direction by initiating camera motion. In an exemplary embodiment of the invention, at least a portion of the selected edge or corner provides visual and/or dynamic feedback, e.g. by blinking or changing color as the user moves the camera in the selected direction and/or when the next frame indicator is hidden. Optionally, the motion direction is predetermined by the camera and/or user and a relevant edge (or portion thereof) is indicated. In an exemplary embodiment of the invention, the user indicates a motion direction by moving the camera and a relevant edge (or portion thereof) is indicated in the viewfinder.

In an exemplary embodiment of the invention, when a potential next frame is in the viewfinder, a feedback signal is provided. Optionally, the feedback signal indicates to the user to stop moving the camera and/or indicates that a next frame has been automatically acquired by the camera. Optionally, the feedback signal includes a change in a color of the border and/or audio signal (e.g. bell or voice prompt).

In another exemplary embodiment of the invention, a stationary aiming target is provided in the field of view of a first frame and a "next frame" indicator is defined at a different position (e.g. at an edge) of the field of view when the first frame is acquired. According to this exemplary embodiment of the invention, the user selects the next frame by moving the camera so that the next frame indicator progresses towards (optionally into) the aiming target. At this stage the next frame is acquired. In an exemplary embodiment of the invention, acquisition of the next frame is initiated automatically in response to positioning of the next frame indicator in the aiming target. Optionally, the aiming target is significantly smaller than the viewfinder screen. In an exemplary embodiment of the invention, the aiming target comprises an edge which is a sixteenth, optionally an eighth, optionally a quarter of the length of a corresponding edge of the viewfinder (or intermediate relative lengths). In an exemplary embodiment of the invention, a decrease in size of the aiming target contributes to ease of aiming.

According to various exemplary embodiments of the invention, the aiming target is provided at a center of the viewfinder or at another location.

In an exemplary embodiment of the invention, a degree of mismatch is visible in the viewfinder to the user throughout the aiming process. Optionally, a user interface evaluates a degree of zoom and/or distance in addition to a spatial alignment.

In an exemplary embodiment of the invention, the user plays a game about getting the next frame indicator to the aiming target. Optionally the next frame indicator is defined as a ball or portion of a ball. Optionally the user plays a game about getting the ball in the aiming target.

In an exemplary embodiment of the invention, the described user interface contributes to improved quality of multidimensional panoramic images (e.g. 3×3 or 4×4 frames) as opposed to conventional "strip panoramas" (e.g. 1×3 or 1×4). Optionally, improved quality of multidimensional panoramic images results from improved alignment of frames in multiple dimensions.

According to various exemplary embodiments of the invention, successive frames in a panoramic image can be arranged horizontally (end-to-end), vertically (top-to-bottom) or diagonally (corner-to-corner).

An aspect of some embodiments of the invention relates to using camera motion (CaMo) to automate selection of an image frame for construction of a panoramic image within a mobile telephone platform. Optionally, the panoramic image is of a large 3D surface. Optionally, sensing of CaMo contributes to automated guidance to a correct next frame. In an exemplary embodiment of the invention, a CaMo engine provides feedback based on sensed camera motion to a user about one or more of direction, panning speed, rotation angle and zoom. In an exemplary embodiment of the invention, the CaMo engine contributes to automatic acquisition of a next frame at a correct speed.

In an exemplary embodiment of the invention, a mobile telephone camera is equipped with a motion sensor that detects a motion direction and/or extent. Optionally, the mobile telephone camera provides feedback regarding motion speed and/or motion direction and/or image suitability to a user. Optionally, presence of moving objects in a panoramic frame and/or presence of faces on an edge contributes to a degree of unsuitability.

In an exemplary embodiment of the invention, mobile telephone camera senses an appropriate "next frame" as the user moves the camera. In an exemplary embodiment of the invention, the "next frame" is acquired when an acceptably small, optionally no, CaMo is detected. Optionally, the next frame is acquired without the user pressing a shutter button. Optionally, the camera indicates to the user to press a shutter button to acquire a next frame. Optionally, a user acquires a next frame by pressing a shutter button without instruction from the camera.

An aspect of some embodiments of the invention relates to combining video and still images to create a panoramic image within a mobile telephone platform. In an exemplary embodiment of the invention, a single frame selected from a video stream as a still image serves as an initial frame for construction of a panoramic image. Optionally, additional frames selected from the video stream are stitched to the initial frame to form the panoramic image. Optionally, one or more still images is captured and stitched to the initial frame to form the panoramic image. In general, resolution of still photos tends to be higher than that achieved in video.

An aspect of some exemplary embodiments relates to interrupting acquisition of frames for a panoramic image and resuming acquisition at a later time. Optionally, interruption occurs to photograph a subject not related to the panorama. Optionally, interruption occurs because an interfering object passes through the panoramic field of view. In an exemplary embodiment of the invention, a user interface featuring overlay alignment contributes to an ability to resume panoramic acquisition. In an exemplary embodiment of the invention, a panoramic image can be assembled by stitching together frames acquired out of sequence based upon CaMo data for each of the frames.

According to some embodiments of the invention, if the CaMo engine and/or the user feel that alignment between successive frames is close, a new frame is captured. Optionally, this "pre-alignment" step contributes to increased ease in computerized stitching to form the panoramic image.

In an exemplary embodiment of the invention, an image frame not spatially related to a sequence of panoramic image frames is acquired and blended into the panoramic image. Optionally, the frame not spatially related to the sequence of panoramic image frames is acquired between successive frames of the panoramic image.

In an exemplary embodiment of the invention, a user interface offers a possibility of continuing from a last acquired frame in the panorama by acquiring an overlapping next frame. Optionally, a degree of overlap is 30, 40, 50 or 60%. Optionally, a 30 to 60% overlap contributes to an ability of the user to correctly align the frames. In an exemplary embodiment of the invention, the overlapping frames are displayed in an overlay alignment with one frame moved "behind" the other frame. Optionally, overlay alignment contributes to an ability of the user to aim the camera correctly.

Optionally, a front frame of the overlay is semi transparent or alternating pixels from the two overlay frames are visible.

Optionally, a frame containing interference (e.g. a pedestrian or vehicle passing through a foreground of the frame) is deleted and recaptured to complete the panoramic sequence of frames.

Optionally, a user standing at a first distance from a photographic subject and acquiring sequential frames of a panoramic image moves to a second distance from the subject, then returns to the first distance and resumes acquisition of sequential frames. Optionally the user acquires unrelated frames at the second distance.

Optionally, acquisition of frames in a panoramic image is interrupted by an external stimulus. In an exemplary embodiment of the invention, the camera is installed in a mobile phone handset and the external stimulus comprises an incoming telephone call or message.

In an exemplary embodiment of the invention, 70 or 80 or 90% or greater identity of pixels in an overlap area between adjacent frames contributes to a capacity to resume capture of an interrupted sequence of panoramic image frames. Optionally, an increase in pixel identity contributes to ease of matching when searching for a next frame to resume capture of a panoramic sequence of frames.

Optionally, unrelated or non-sequential or alternate range frames are blended with a sequence of frames forming a panoramic image. Optionally, the camera and/or the user select appropriate blending strategies.

An aspect of some embodiments of the invention relates to a 3D projection of a panoramic image within a mobile telephone platform. According to exemplary embodiments of the invention, a projection angle of the 3D projection can be variable from the mobile phone or fixed.

An aspect of some embodiments of the invention relates to inclusion of visually unrelated images in a panoramic image to form a collage. Optionally, the visually unrelated images comprise a sticker and/or at least a portion of a spatially discontiguous frame.

An aspect of some embodiments of the invention relates to use of mosaic templates in construction of a panoramic image.

Optionally, collage formation and/or template application are performed within a mobile phone handset.

In an exemplary embodiment of the invention, there is provided a method of assembling a panoramic image from a plurality of frames in a camera, the method comprising:

(a) acquiring a video stream using a camera;
(b) selecting an initial frame from the video stream for capture as a still image;
(c) further selecting at least one additional frame; and
(d) stitching the at least one additional frame to the initial frame in the camera to create a panoramic image.

Optionally, the camera is installed in a mobile phone handset.

Optionally, the additional frames are selected from the video stream.

Optionally, the at least one additional frame is captured as an additional still image.

Optionally, the further selecting is performed via overlay alignment.

Optionally, the selection of frames is performed via overlay alignment.

Optionally, detection of camera motion (CaMo) contributes to the further selecting.

Optionally, detection of camera motion comprises detecting CaMo direction.

Optionally, detection of CaMo indicates user's hand stability using CaMo (e.g. STRI's AutoShot functionality).

Optionally, detection of camera motion comprises detecting CaMo speed.

Optionally, detection of camera motion comprises providing feedback on CaMo.

Optionally, detection of camera motion comprises providing feedback on CaMo direction and/or CaMo speed.

Optionally, an absence of CaMo triggers acquisition of an additional frame.

Optionally, selecting is performed manually by a user.

Optionally, the method comprises detection of at least one undesirable feature.

Optionally, the undesirable feature comprises a face.

Optionally, the further selecting is performed automatically by the camera.

Optionally, the further selecting is performed manually by a user.

Optionally, the panoramic image is of a 3D surface.

In an exemplary embodiment of the invention, there is provided a method of providing a virtual 3D projection of a panoramic image in a camera, the method comprising:

(a) storing a panoramic image in a memory of a mobile telephone; and
(b) applying a projection algorithm to produce a virtual 3D projection of the panoramic image on a display of the camera.

Optionally, the camera is installed in a mobile phone handset.

Optionally, the method comprises:
(c) selecting a projection algorithm so that the 3D projection emulates projection on a surface with desired characteristics.

Optionally, the method comprises:
is performed via overlay alignment.
selecting a projection method that emulates a live video of a real-world 3D scene by dynamically updating the device's screen according to a changing point of view.

Optionally, the method comprises:
dynamically updating the device's screen according to a changing point of view to emulate a live video of a real-world 3D scene.

Optionally, the method comprises:
(c) selecting a projection algorithm so that the 3D projection emulates projection on a surface from a desired angle.

Optionally, the projection algorithm allows the user to dynamically change a projection angle to simulate a real-world look and feel.

In an exemplary embodiment of the invention, there is provided a user interface for a mobile phone, the user interface adapted to aid the user to align a next frame of a panoramic image with a view area of a camera incorporated in the phone, the interface comprising:
(a) a motion direction indicator visible to a user; and
(b) a next frame alignment indication.

Optionally, the interface comprises a direction selection module adapted for selection of a motion direction for acquisition of the next frame.

Optionally, the visible motion direction indicator comprises at least a portion of an edge of the view area.

Optionally, the visible motion direction indicator comprises an arrow.

Optionally, a correct alignment of the next frame with the view area produces a stop signal which alerts the user to hold the camera in position so that the next frame can be acquired.

Optionally, the next frame alignment indication comprises an aiming object and an aiming target; wherein alignment of the aiming object with the aiming target indicates that the next frame is properly aligned.

Optionally, the interface is organized as a game in which scoring is based upon speed of alignment of the aiming object with the aiming target.

Optionally, the interface is used to create a matrix of frames which is panoramic in two different dimensions.

In an exemplary embodiment of the invention, there is provided a method of assembling a panoramic image using a camera, the method comprising:
(a) acquiring at least one frame belonging to a panoramic image using the camera;
(b) acquiring at least one frame not belonging to the panoramic image;
(c) resuming acquisition of frames belonging to a panoramic image; and
(d) assembling the panoramic image from at least one frame acquired in (a) and at least one frame acquired in (c).

In an exemplary embodiment of the invention, there is provided a method of assembling a panoramic image using a camera, the method comprising:
(a) acquiring at least one frame belonging to a panoramic image using the camera;
(b) interrupting the acquiring and changing an aiming direction of the camera;
(c) resuming acquisition of frames belonging to a panoramic image; and
(d) assembling the panoramic image from at least one frame acquired in (a) and at least one frame acquired in (c).

Optionally, the camera is installed in a mobile phone handset.

Optionally, the at least one frame not belonging to the panoramic image is excluded because it contains an interfering object.

Optionally, the at least one frame not belonging to the panoramic image is acquired from a different position.

In an exemplary embodiment of the invention, there is provided a method of producing a composite image on camera; the method comprising:
(a) providing a first image on a display of the camera;
(b) selecting a second image;
(c) indicating a position on the first image; and
(d) applying the second image to the first image at the indicated position to produce a composite image.

Optionally, the second image is smaller than the first image.

Optionally, the camera is installed in a mobile phone handset.

Optionally, the first image is a panoramic image.

Optionally, the second image comprises a clip-art graphic image.

Optionally, the second image comprises at least a portion of a photographic image.

Optionally, the second image is acquired between two frames of a first image comprising a photographic panorama.

Optionally, the method comprises:
(e) assigning a degree of transparency to the second smaller image.

In an exemplary embodiment of the invention, there is provided a camera adapted to assemble a panoramic image from a plurality of frames, the camera comprising:
(a) a video acquisition module capable of providing a video stream;
(b) a selector module adapted to select an initial frame from the video stream for capture as a still image;
(c) a user interface adapted to guide a user in selecting additional frames; and
(d) a stitching module adapted to stitch the additional frames to the initial frame to create a panoramic image.

Optionally, the camera is provided as part of a mobile phone handset.

In an exemplary embodiment of the invention, there is provided a camera adapted to provide a virtual 3D projection of a panoramic image, the camera comprising:
(a) a memory adapted for storage therein of a panoramic image; and
(b) analytic circuitry adapted to apply a projection algorithm to produce a virtual 3D projection of the panoramic image on a display of the camera.

Optionally, the camera is provided as part of a mobile phone handset.

In an exemplary embodiment of the invention, there is provided a mobile phone handset adapted to aid the user to align a next frame of a panoramic image with a view area of a camera incorporated in the handset, the handset comprising circuitry adapted for presentation of a user interface comprising
(a) a visible motion direction indicator; and
(b) a next frame alignment indication.

In an exemplary embodiment of the invention, there is provided a camera comprising circuitry adapted to assemble a panoramic image, the camera comprising:
(a) a frame acquisition module;
(b) circuitry comprising a panoramic assembly module which permits the user to:

(i) acquire at least one frame belonging to a panoramic image;

(ii) acquire at least one frame not belonging to the panoramic image; and (iii) resume acquisition of frames belonging to the panoramic image; and (d) a stitching engine adapted to assembling the panoramic image from at least one frame acquired in (i) and at least one frame acquired in (ii).

Optionally, the camera is provided as part of a mobile phone handset.

In an exemplary embodiment of the invention, there is provided a camera comprising:

(a) a display adapted to present a first image;

(b) a user accessible library of second images;

(c) a selection module adapted for selection of a second image; and (d) a user operable alignment module adapted to apply the second image to the first image at a selected location.

Optionally, the camera is provided as part of a mobile phone handset.

Optionally, some embodiments of the invention employ a remote server to make decisions. Optionally, the decisions include one or more of decisions about quality, alignment, order and consistency of frames.

In an exemplary embodiment of the invention, there is provided a display screen of a mobile phone handset adapted to aid the user to align a next frame of a panoramic image with a view area of a camera incorporated in the handset, the handset comprising circuitry adapted for onscreen presentation of:

(a) a motion direction indicator; and (b) a next frame alignment indication responsive to camera motion.

In an exemplary embodiment of the invention, there is provided a camera comprising circuitry adapted to assemble a panoramic image, the camera comprising:

(a) a frame acquisition module for acquiring frames;

(b) a memory with plurality of frames stored therein, only some of the frames belonging to a panoramic image;

(c) a stitching engine adapted to identify those frames in the memory which belong to the panoramic image and assemble the identified frames in sequence.

Optionally, the camera is provided as part of a mobile phone handset.

In an exemplary embodiment of the invention, there is provided a camera comprising:

(a) a display adapted to present a first image;

(b) a user accessible library of second images;

(c) a selection module adapted for selection of a second image; and (d) a user operable alignment module adapted to apply the second image to the first image at a selected location.

Optionally, the camera is provided as part of a mobile phone handset.

In an exemplary embodiment of the invention, there is provided a camera comprising:

(a) a user interface adapted for manual alignment of two frames via overlay to produce a pair of pre-aligned frames; and (b) a stitching module adapted to receive the pre-aligned frames and perform an exact alignment.

Optionally, the camera is provided as part of a mobile phone handset.

BRIEF DESCRIPTION OF THE DRAWINGS

Exemplary non-limiting embodiments of the invention described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIGS. 3a, 3b, 3c and 3d are schematic representations of a mobile phone user interface for acquisition of frames of a panoramic image according to exemplary embodiments of the invention;

FIG. 4 is a schematic representation of application of a graphic "sticker" to an image according to an exemplary embodiment of the invention;

FIG. 5 is a schematic representation of blending of an additional image from a series of stored images to an image according to an exemplary embodiment of the invention;

FIGS. 9a; 9b; 9c and 9d represent schematically different exemplary sequences for acquisition of frames in an exemplary panoramic matrix.

DESCRIPTION OF EXEMPLARY EMBODIMENTS

Overview

Figure 1A:
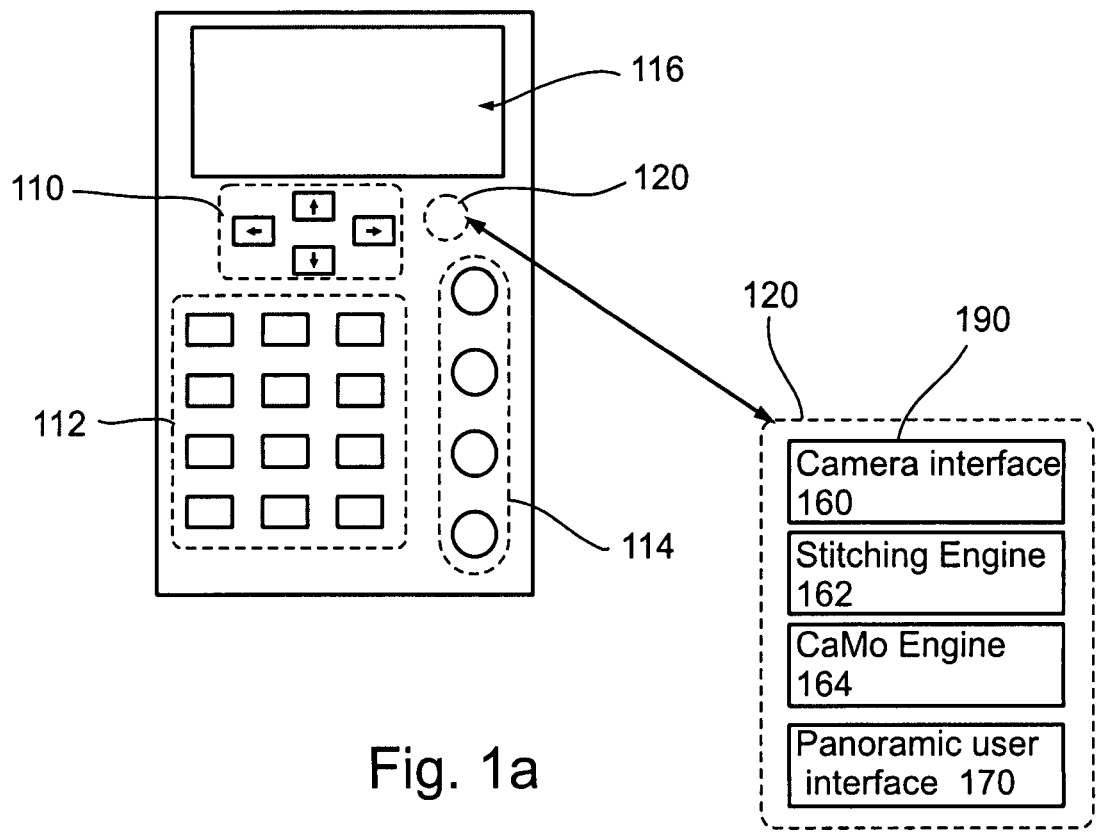
FIGS. 1a and 1b are schematic representations of front and back sides respectively of a mobile telephone handset adapted to provide a panoramic imaging interface according to an exemplary embodiment of the invention.
Figure 1B:
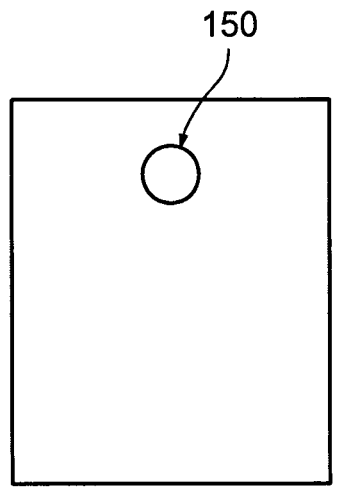

FIGS. 1a and 1b are schematic representations of front and back sides respectively of a mobile telephone handset adapted to provide a panoramic imaging interface according to one or more exemplary embodiments of the invention. Exemplary handset 100 comprises a display screen 116 (FIG. 1a), a standard twelve key telephone keypad 112 and a navigation device 110. Optionally one or more auxiliary function keys 114 are included. In an exemplary embodiment of the invention, auxiliary function keys 114 are used to control camera functions. In the depicted embodiment (FIG. 1b) a lens 150 is visible on the back of handset 100.

In an exemplary embodiment of the invention, a memory device 120 stores a panoramic imaging module 190. Optionally, imaging module 190 is further subdivided into functional components. In the depicted embodiment, imaging module 190 comprises a camera interface 160, a camera motion (CaMo) engine 164, a stitching engine 162, and a panoramic user interface 170.

In an exemplary embodiment of the invention, camera interface 160 provides menus and/or instructions to a user on display 116. Optionally, camera interface 160 operates concurrently or sequentially with presentation of a view area of lens 150 on display 116.

In an exemplary embodiment of the invention, CaMo engine 164 monitors a direction and/or velocity of camera motion as the user sweeps or pans across an area comprising multiple fields of view of lens 150. Optionally, panning is horizontal, vertical or diagonal.

In an exemplary embodiment of the invention, panoramic user interface 170 aids the user in adjusting panning direction and speed of motion for panorama acquisition and/or selecting frames belonging to a panoramic image and/or in manipulation of the panoramic image after it is acquired.

In an exemplary embodiment of the invention, stitching engine 162 assembles or "stitches" the frames together to form the panoramic image. Optionally, a degree of overlap between successive frames of the image contributes to image clarity for static subjects (e.g. landscapes). Optionally, a degree of overlap between successive frames of the image detracts from image clarity for dynamic subjects (e.g. streets with moving vehicles or crowds of people).

In an exemplary embodiment of the invention, the panoramic image is of a 3D object. Optionally, different portions of the 3D object are photographed from different angles.

Exemplary Methods

Figure 2A:
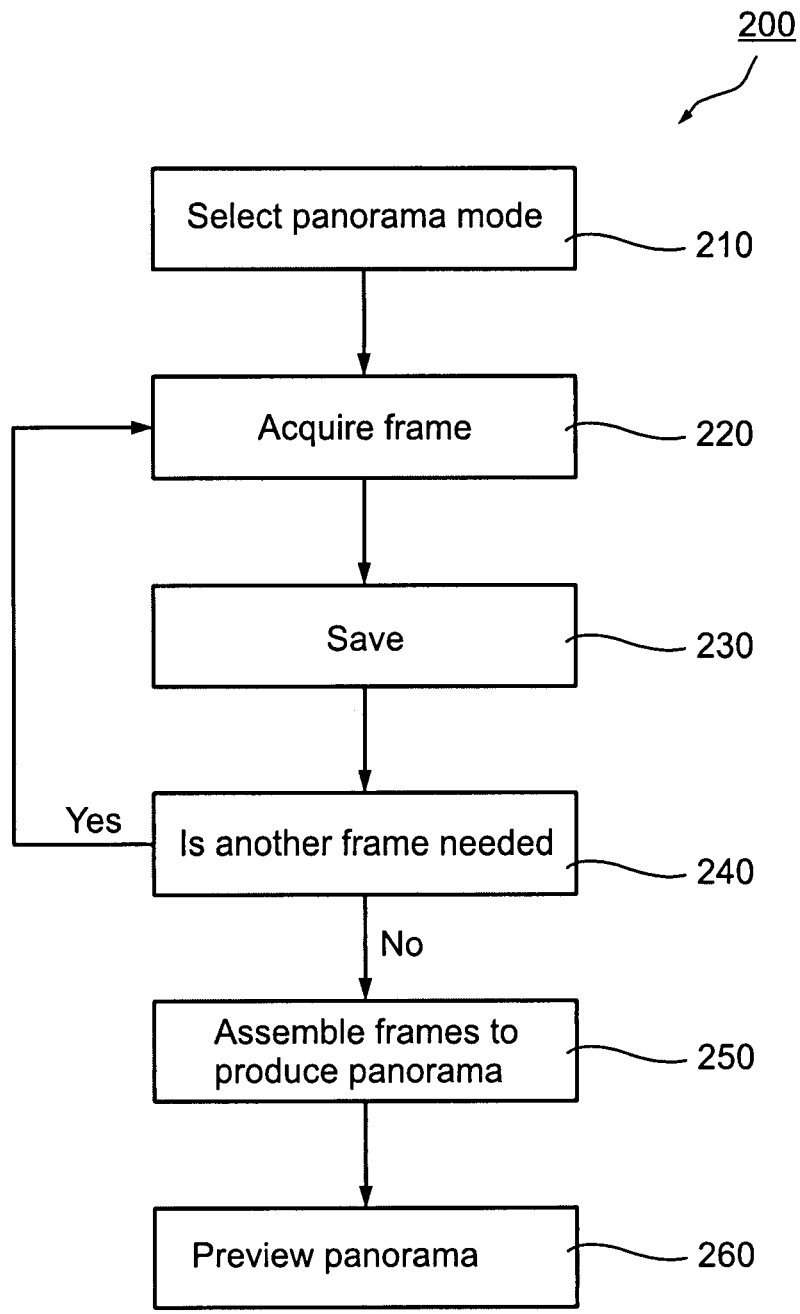
FIGS. 2a; 2b; 2c and 2d are flow diagrams illustrating exemplary methods of panoramic picture acquisition and manipulation according to various exemplary embodiments of the invention.

FIGS. 2a; 2b; 2c and 2d are flow diagrams illustrating exemplary methods of panoramic picture acquisition and manipulation according to various exemplary embodiments of the invention.

FIG. 2a is a simplified flow diagram depicting an exemplary method 200 of acquisition of a panoramic image on a mobile phone handset (e.g. 100). At 210 a user is presented with a menu and selects photography and panorama mode within photography. At this stage lens 150 is activated and display screen 116 begins to function as a viewfinder. The user compares what is visible in viewfinder 116 to the entire scene before them and selects a frame to serve as a first frame for a panoramic series. Optionally, this first frame comprises one end of a conventional strip panorama. Alternatively, or additionally, the first frame comprises one frame of a matrix which is panoramic in two dimensions. In an exemplary embodiment of the invention, the camera is acquiring a video stream when the first frame is acquired. Optionally, the camera continues to acquire a video stream as additional frames are acquired.

At 220, the selected frame is acquired and at 230 it is saved.

At 240, the camera asks the question: "Is another frame needed?"

In some exemplary embodiments of the invention, the user defines a number of frames to be acquired ahead of time. According to these exemplary embodiments of the invention, the camera compares a number of frames currently saved to the defined number of frames and ascertains the answer automatically.

In some exemplary embodiments of the invention, the user defines a number of frames to be acquired during image frame acquisition. Definition of a number of frames can be accomplished, for example, by defining an overall size of the panorama, for example by sweeping or panning with the camera. According to these exemplary embodiments of the invention, the user answers the question manually. Optionally, the answer is conveyed to camera interface 160 by pressing one of auxiliary keys 114. Optionally, a default number of frames (e.g. 3, 5 or 8) is selected automatically if no user input is received. Optionally, the answer yes is assumed by default, and the user can override and answer no (meaning end of acquisition) by pressing one of auxiliary keys 114.

If the answer to the question is yes, acquisition 220 and saving 230 are repeated.

When a sufficient number of frames have been acquired, the answer to the question is no. At this stage, all stored frames are assembled 250 to produce a panoramic image. Optionally, assembly is performed by stitching engine 162.

In an exemplary embodiment of the invention, the panoramic image is presented as a preview 260 on display 116. Optionally, the preview is not subject to manipulation or editing at this stage. Optionally, the user is asked if the previewed panorama should be stored for future display and/or editing and/or manipulation and/or transmission. Optionally, panoramic images produced by exemplary embodiments of the invention can be transmitted to another device. Alternatively, or additionally, the user can select to improve the image by indicating an area to be reacquired. Optionally, the user interface guides the user to aim camera so as to reacquire the selected area.

In an exemplary embodiment of the invention, the other device comprises one or more additional mobile phone handsets and the panoramic image is included in a Multi-Media Message Service (MMS) message. Alternatively, or additionally, transfer to another mobile phone handset can be performed locally, e.g. via Bluetooth, infrared or another wireless protocol.

In an exemplary embodiment of the invention, the other device comprises one or more remote servers and the panoramic image is up-loaded to the server (e.g. using WAP).

Figure 2B:
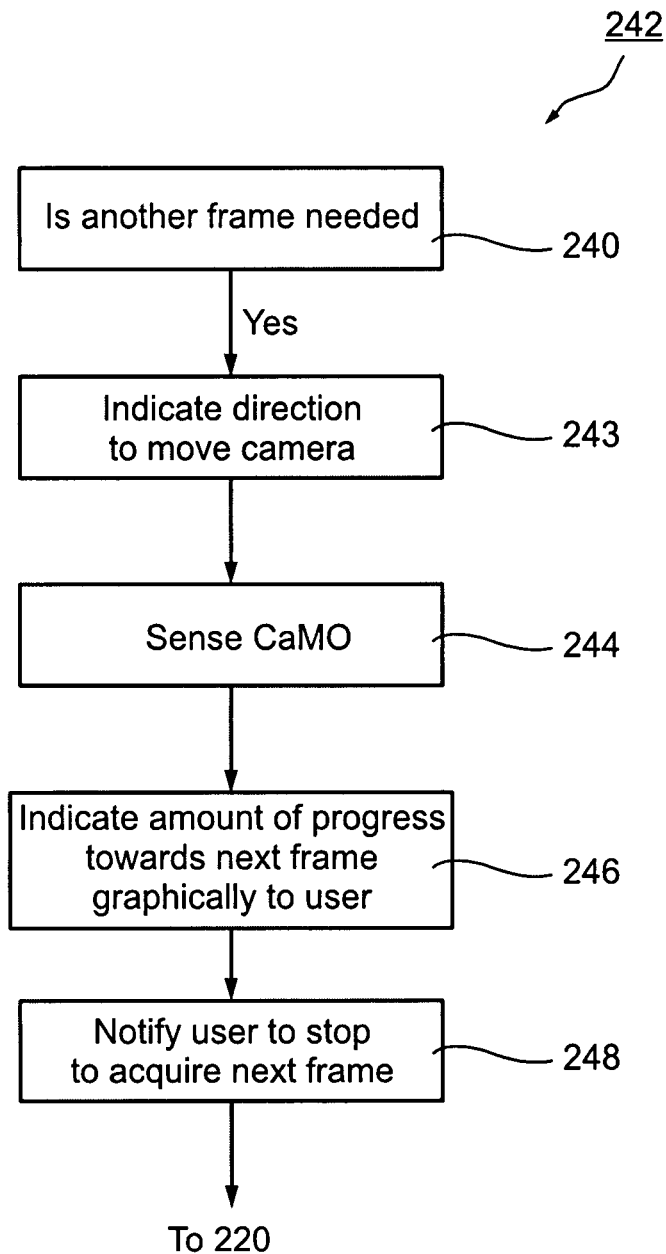

FIG. 2b is a simplified flow diagram depicting an exemplary method 242 which aids a user in selecting frames for inclusion in the panoramic image by means of a user interface in greater detail.

At 240, the camera asks the question: "Is another frame needed?" (as in FIG. 2a).

In response to a "yes" answer which can be delivered automatically or manually as described above, the user is presented with an indication 243 in which direction to move the camera of handset 100.

At 244, CaMo is sensed. In an exemplary embodiment of the invention, sensing is performed by CaMo engine 164.

At 246, an indication of an amount of progress towards a next frame is indicated graphically to the user. In an exemplary embodiment of the invention, graphic indications are presented in display 116 over a currently visible viewing area of lens 150.

At 248, a notification to the user to stop to acquire the next frame is provided. Optionally, the next frame is acquired (220; FIG. 2a) manually or automatically as described hereinabove.

Figure 2C:
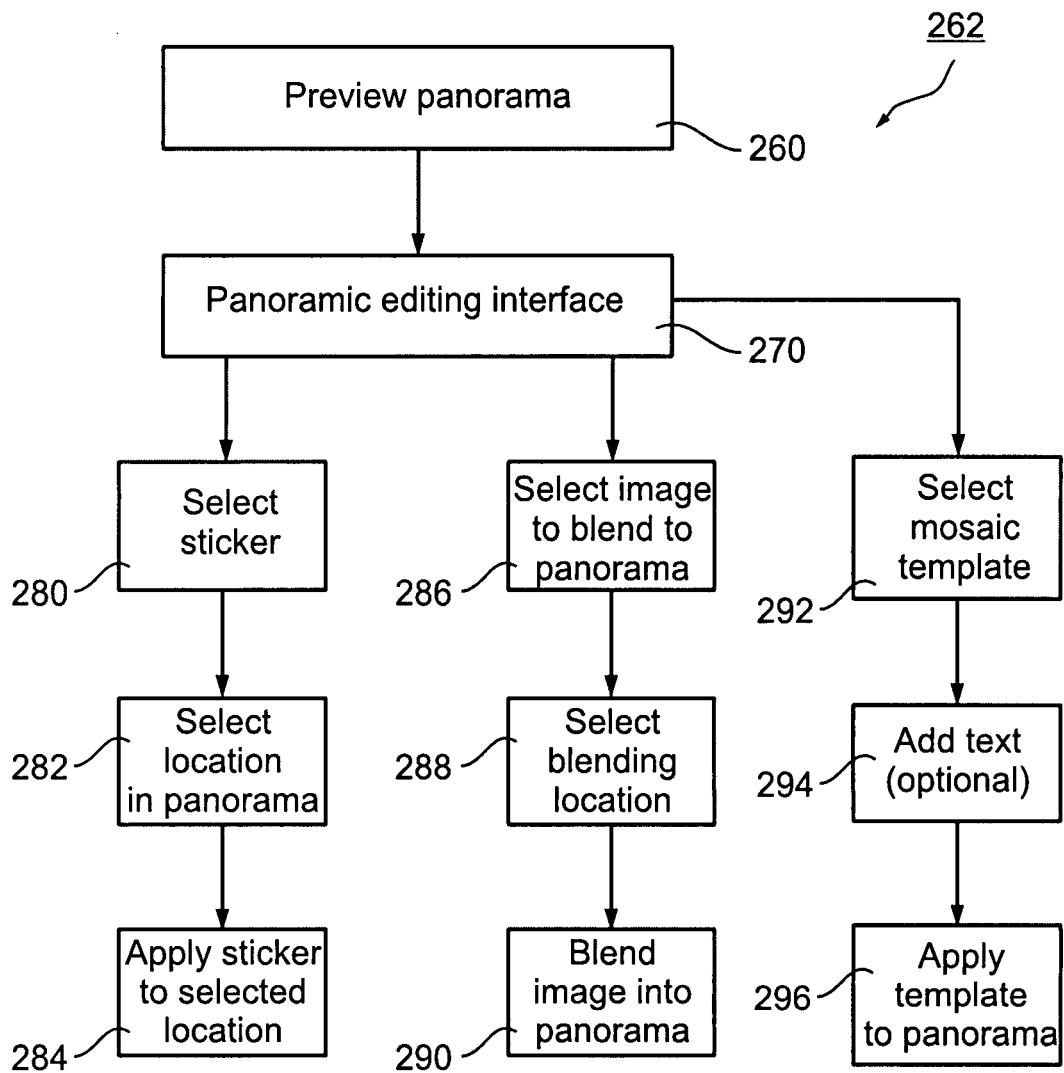

In an exemplary embodiment of the invention, panoramic user interface 170 (FIG. 1a) comprises panoramic editing interface 270 which is described in greater detail in FIG. 2c.

FIG. 2c is a simplified flow diagram depicting exemplary methods 262 of editing and/or manipulation of an acquired panoramic image in a mobile telephone handset according to exemplary embodiments of the invention.

The flow diagram begins with preview panorama (260 of FIG. 2a) indicating that a complete panoramic image has been acquired and is available.

With a previewed panorama 260 visible on display 116 (FIG. 1), the user selects a panoramic editing interface 270. Optionally, editing interface 270 offers the user more than one editing possibility. In the depicted embodiment, three main editing possibilities are offered, although the actual number of options may be greater than three or less than three according to different exemplary embodiments of the invention. Optionally, there is a trade off between number of editing possibilities offered and available hardware memory and/or computing capacity in mobile phone handset 100.

The three main editing possibilities depicted in FIG. 2c are application of a sticker to a panoramic image, blending of an image to a panorama and application of a mosaic template to a panorama. According to exemplary embodiments of the invention, the user selects one or more of these possibilities.

In an exemplary embodiment of the invention, the user applies a sticker to a panoramic image.

At 280 a user selects a sticker. The stickers are optionally provided as clip-art in any available image format including, but not limited to, jpeg, tiff and gif. Typically, there is a trade off between the number of stickers available for selection and available hardware memory in mobile phone handset 100. Optionally, availability of stickers for download from a remote server contributes to a reduction in demands on available hardware memory in mobile phone handset 100.

At 282, the user selects a location within the panoramic image. Optionally, location selection is by manipulation of a cursor on display 116 using navigation device 110. In an exemplary embodiment of the invention, automating sensing of CaMo is used for cursor manipulation. Optionally, the user moves the cursor by moving the camera.

At 284 the user applies the sticker to the selected location. Optionally, application is by operation of an auxiliary key 114 or by selection of an "apply" command from a menu. Optionally, sticker selection 280 and application 284 are integrated into a single operation. Optionally, application 284 is performed prior to location selection 282 and the selected sticker serves as a cursor.

In an exemplary embodiment of the invention, the user blends a photographic image to a panoramic image.

At 286, the user selects an image to blend into the panorama. Again, there is a trade off between the number of images available for selection and available hardware memory in mobile phone handset 100. Optionally, availability of images for blending as downloadable items from a remote server contributes to a reduction in demands on available hardware memory in mobile phone handset 100.

At 288 the user selects a location within the panoramic image. Optionally, location selection is as described above for sticker application.

At 290 the user blends the selected image to the selected location. Optionally, blending is as described above for sticker application. Optionally, blending 290 and image selection 286 are performed concurrently. Optionally, an order of the operations is changed so that selecting 288 of the blending location includes moving the image selected at 288 over the panorama. Optionally, a portion of the selected image is moved over the panoramic image as an overlay. In an exemplary embodiment of the invention, moving at least a portion of the image over the panoramic image contributes to an ability to achieve a correct alignment. Optionally, CaMo and/or a navigation device are employed to move the overlaid image with respect to the panorama. In an exemplary embodiment of the invention, analytic circuitry provides a precise alignment based upon an initial alignment provided by the user.

In an exemplary embodiment of the invention, the user applies a mosaic template (e.g. template 700 of FIG. 7; described hereinbelow) to a panoramic image. Optionally, application of a template to an assembled panoramic image contributes to a reduction in perceptibility of imperfections at stitching junctions and/or to a reduction in perceptibility of parametric differences between frames. Parametric differences between frames include, but are not limited to, white balance, lighting level, contrast, viewing angle and applied degree of zoom.

At 292, the user selects a mosaic template from among a group of mosaic templates. Again, there is a trade off between the number of templates available for selection and available hardware memory in mobile phone handset 100.

At 294, the user optionally adds text to the template. At 296, the user applies the selected template to the panoramic image to create the mosaic.

Figure 2D:
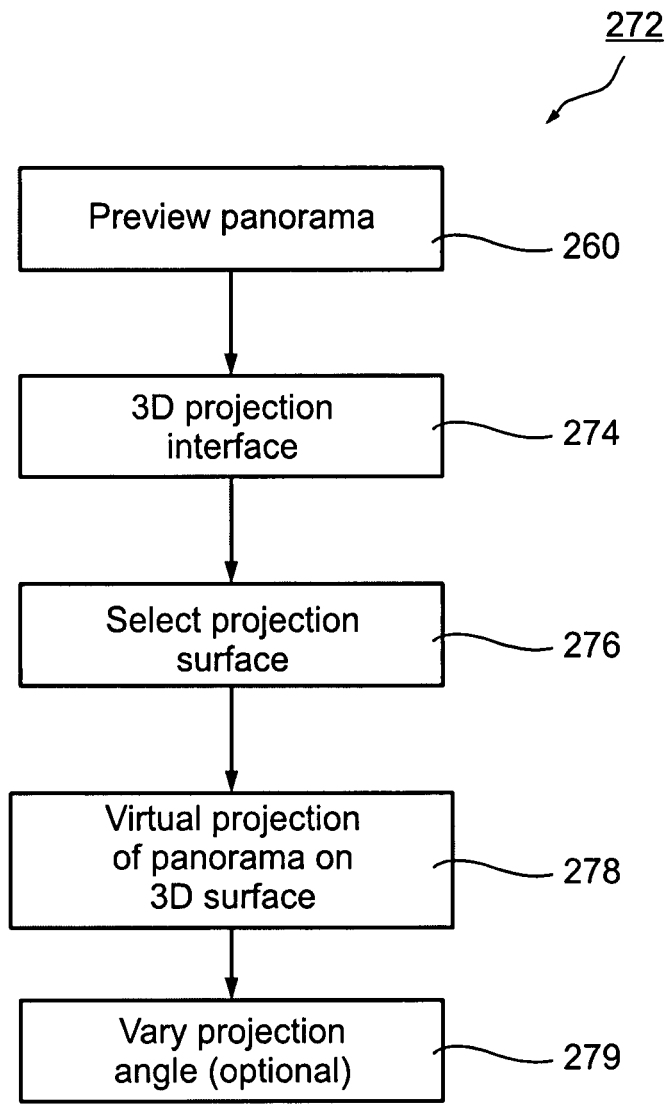

FIG. 2d is a simplified flow diagram depicting a method 272 for virtual projection of a panoramic image on a 3D surface.

In an exemplary embodiment of the invention, method 272 begins after acquisition of a panoramic image and preview 260 (FIG. 2a) of the panorama on display 116 (FIG. 1). In other exemplary embodiments of the invention, method 272 begins whenever the user wishes to view a recorded panorama.

At 274 the user selects a 3D projection interface 274. Optionally, projection interface 274 is provided as a part of panoramic user interface 170.

At 276, the user optionally selects a projection surface. Exemplary projection surfaces include, but are not limited to, a concave surface, a convex surface and a sphere. In an exemplary embodiment of the invention, selection of a surface indicates to panoramic user interface 170 which projection algorithm to apply. 3D projection algorithms are known to those of ordinary skill in the art. Algorithms suitable for use in the context of the present invention can be found, for example, in "Image Alignment and Stitching: A Tutorial" by Richard Szeliski (Preliminary draft, Sep. 27, 2004, Technical Report, MSR-TR-2004-92. pages 8-10; which is fully incorporated herein by reference) and/or in U.S. patent applications 2006/0062487, 2006/0018547, 2005/0200706, 2005/0008254 and 2004/0130626 by Ouchi et al. which are each fully incorporated herein by reference. Additional algorithms suitable for use in the context of the present invention are disclosed in a related application Ser. No. 11/826,772 entitled "METHOD FOR CONSTRUCTING A COMPOSITE IMAGE" by Noam SOREK and Orna BREGMAN AMITAI filed the same date as the instant application and fully incorporated herein by reference.

At 278, virtual projection of the panorama on the 3D surface is performed and the result is displayed on display 116 and/or stored in a memory. Optionally, a stored virtual projection can be transmitted to another device (e.g. another mobile phone handset) and/or viewed in the future. Optionally, virtual projection 278 occurs automatically after selection 276 of the projection surface. In an exemplary embodiment of the invention, only one projection surface is available and selection of 3D projection interface 274 leads directly to virtual projection 278.

Optionally, (279) the user can vary the projection angle and zoom with respect to the selected surface. Optionally, this variation can be performed before or during virtual projection 278. In an exemplary embodiment of the invention, the user moves the camera and the CaMo engine interprets the motion and alters the apparent projection angle accordingly. Mobile phone handsets 100 with greater memory and/or computing capacity will typically be able to more rapidly adjust virtual projection 278 in response to variations in projection angle 279 specified by the user.

Exemplary Next Frame Alignment Interface

FIGS. 3a, 3b, 3c and 3d are schematic representations of a mobile phone user interface for acquisition of frames of a panoramic image according to exemplary embodiments of the invention. These figures illustrate one or more exemplary modes of practice of method 242 (FIG. 2b).

FIG. 3a depicts a series of scenes (from left to right) visible in a viewing frame 310 on a display screen 116 of mobile phone handset (100 of FIG. 1a) as the user acquires a first image frame of a panoramic image and moves the camera to the right in order to line up a next frame of the panoramic image. The series of scenes illustrate optional features of an exemplary user interface 300 according to an exemplary embodiment of the invention.

In the left most panel, the user selects a first frame including two objects (tree 302 and mountain 304). A center target 320 is substantially empty in this view. The user initiates panoramic acquisition, for example by pressing a shutter button (e.g. one of auxiliary keys 114). In an exemplary embodiment of the invention, the user then selects a panoramic orientation by beginning to move the camera. In the depicted example, camera motion (CaMo) is to the right.

Automatic sensing of CaMo is well known to those of ordinary skill in the art and is described, for example, in co-pending U.S. patent application 20070041058 entitled "A Device and A Method For Identifying Movement Patterns" filed on Aug. 14, 2006 by Eli BEN-AMI and Israel DISATNIK and 20070041616 entitled "A Displacement and Tilt Detection Method For A Portable Autonomous Device Having An Integrated Image Sensor and A Device Therefor" filed on Aug. 14, 2006 by Jonggoo LEE, Eli BEN-AMI, Israel DISATNIK and Natan LINDER. The disclosures of these applications are each incorporated herein by reference.

In an exemplary embodiment of the invention, combining "feature detection" capabilities with the CaMo engine can affect a desired degree of overlap. For example, if faces are detected, the overlap area may be enlarged to ensure that a complete face will be taken from one picture and will not be part of the stitching area. Optionally, it is advantageous to make this determination prior to looking for a next frame. According to different exemplary embodiment of the invention, this capability can be optional (i.e. subject to user selection) or integrated. A level of importance of this feature optionally varies with a degree of acquaintance of the photographer to subjects of the photograph. Optionally, the user indicates whether a particular face should, or should not, be allowed to include a stitch line. In another example, if faces are detected, the camera can suggest taking pictures so that faces are overlapped.

In the second panel from the left, CaMo engine 164 has sensed the camera motion and provided a direction indicator 330. Optionally, direction indicator 330 blinks. Although direction indicator 330 is depicted as a rectangle, it can be provided as any desired shape. Optionally, direction indicator 330 is provided as an arrow. Optionally, direction indicator 330 can occupy an entire edge of viewing frame 310. In an exemplary embodiment of the invention, direction indicator 330 helps the user to move the camera properly. Optionally, direction indicator 330 can also indicate speed of CaMo. For example, if speed of CaMo is too high, indicator 330 may turn yellow, then orange and eventually red. If speed of CaMo is within an acceptable range, indicator 330 may turn green. Other feedback means including, but not limited to, color and/or graphic and/or iconic feedback and/or audio feedback (e.g. speech and/or sounds) can be employed in this context.

As the camera pans to the right, tree 302 disappears out of the left side of viewing frame 310 and mountain 304 occupies progressively more of frame 310.

The third panel from the left depicts two additional exemplary features of user interface 300.

In an exemplary embodiment of the invention, a "next frame border" 350 is provided on display 116. Optionally, next frame border 350 can aid the user in vertical and/or horizontal alignment of the next frame with a previous frame of the panoramic image under construction. As the user pans to the right, next frame border 350 covers progressively more of viewing frame 310. If the user moves the camera up or down, next frame border 350 becomes vertically misaligned with viewing frame 310 and the user intuitively understands what correction to CaMo is desirable to achieve proper alignment.

Alternatively, or additionally, a "next frame center indicator" 340 is provided. Next frame center indicator 340 is to be aligned with center target 320 for acquisition of the next frame. As with next frame border 350, the user intuitively adjusts CaMo to align center indicator 340 with center target 320.

The right most panel depicts correct alignment of the next frame with viewing frame 310. At this stage next frame border 350 is fully aligned with viewing frame 310 and/or next frame center indicator 340 is fully aligned with center target 320. In an exemplary embodiment of the invention, CaMo is briefly interrupted at this to permit capture of the next image frame. Optionally, capture of the next image frame can be automatic or manual. In an exemplary embodiment of the invention, capture of the next image frame is automatic and user interface 300 provides a signal to the user to cease CaMo. According to exemplary embodiments of the invention, the signal can include one or more of a change in appearance of next frame border 350, a change in appearance of next frame center indicator 340, a change in appearance of direction indicator 330 and, an audible signal (e.g. tone, bell or synthetic voice prompt). Change of appearance as used here can indicate one or more of a change in color, texture, degree of transparency and blinking rate.

In some exemplary embodiments of interface 300, both next frame border 350 and next frame center indicator 340 are provided. In other exemplary embodiments of the invention, only one of next frame border 350 and next frame center indicator 340 is provided.

Optionally, alignment of the next frame is presented to the user as a game. In an exemplary embodiment of the invention, center target 320 and center indicator 340 are graphically modified to conform to a theme. Optionally the theme is a sports theme. For example, center target 320 can be presented as a goal and center indicator 340 can be presented as a football. Optionally, a time used to place the ball in the goal is presented to the user.

In an exemplary embodiment of the invention, center target 320 and/or center indicator 340 are sized to occupy only a small portion of viewing frame 310. Optionally, a small size of center target 320 and/or center indicator 340 contributes to an ability of the user to align these objects. Optionally, center target 320 and center indicator 340 are a same (e.g. two rectangles of different sizes) or different shapes (e.g. a circle sized to be inscribed in a square). In an exemplary embodiment of the invention, center indicator 340 is configured as a cross and center target 320 is a geometric shape (e.g. circle or square) in which the cross is to be inscribed. Optionally, inscription of a cross in a geometric shape is intuitively understood by the user.

In an exemplary embodiment of the invention, the target is provided in a location other than a center of viewing frame 310. Optionally, a position of the target is adjusted relative to a desired degree of overlap of consecutive frames.

FIG. 3D illustrates exemplary ways of indicating to the user that CaMo is inappropriate for aligning the next frame. In the depicted exemplary frame, mountain 304 is still in view, but the user has shifted the camera upwards. The type and degree of misalignment are optionally presented to the user in one or more of at least three exemplary ways.

In a first optional information presentation mode, motion direction indicator 330 moves from its nominal position in the center of the right edge of viewing frame 310 to a lower right corner of viewing frame 310. This indicates to the user that the camera should be shifted down while motion to the right continues.

In a second optional information presentation mode, next frame center indicator 340 appears below center target 320 and the user understands intuitively that the camera should be lowered to bring 340 and 320 into vertical alignment with one another.

In a third optional information presentation mode, next frame border 350 appears below viewing frame 310 and the user understands intuitively that the camera should be lowered to bring 350 and 310 into vertical alignment with one another.

In another optional information presentation mode (depicted in FIG. 3b), next frame center indicator 340 appears above center target 320 and the user understands intuitively that the camera should be lowered to bring 340 and 320 into vertical alignment with one another.

In another optional information presentation mode (also depicted in FIG. 3b), next frame border 350 appears above viewing frame 310 and the user understands intuitively that the camera should be lowered to bring 350 and 310 into vertical alignment with one another.

In an exemplary embodiment of the invention, two, optionally three of these information presentation modes are used in conjunction with one another as depicted in FIG. 3d, although any one of the three can be sufficient to cause the user to implement a proper corrective motion of the camera.

FIG. 3c illustrates an exemplary way of indicating to the user that CaMo is inappropriate for aligning the next frame. In the depicted exemplary frame a gross misalignment has occurred so that mountain 304 is no longer visible because the user has moved the camera too far up. The user sees irrelevant objects (e.g., bird 304, cloud 306 and sun 308) in viewing frame 310 but has no intuitive understanding of a spatial relationship between these objects and a desired next frame for the panoramic image under construction. In the depicted embodiment, CaMo engine 164 aids the user by providing an arrow 358 indicative of a direction to move the camera so that next frame border 350 and/or next frame center indicator 340 can be displayed in at least a portion of viewing frame 310. In other embodiments, CaMo engine 164 aids the user by providing an arrow 358 indicative of a direction to move the image so that next frame border 350 and/or next frame center indicator 340 can be displayed in at least a portion of viewing frame 310.

Arrow 358 is depicted in aiming target 320 but can optionally be presented anywhere in viewing frame 310. Optionally, a size of arrow 358 indicates an amount of motion to be undertaken for the desired correction. In an exemplary embodiment of the invention, as the user moves the camera in a correct direction, arrow 358 shrinks until it eventually disappears and is replaced by one or more of next frame border 350, next frame center indicator 340 and motion direction indicator 330. Optionally, a situation similar to that depicted in FIG. 3b provides a transition between the gross misalignment of FIG. 3c and proper alignment of FIG. 3a.

In an exemplary embodiment of the invention, arrow 358 can point in one of four directions (up, down, left and right). According to this embodiment of the invention, interface 300 performs a diagonal correction in two separate steps (e.g. down and left).

In an exemplary embodiment of the invention, arrow 358 can point in one of eight directions (up, down, left, right and four diagonal directions). According to this embodiment of the invention, interface 300 performs corrections in a single step.

Exemplary Collage Production

According to some exemplary embodiments of the invention, a panoramic image is incorporated into a collage on a mobile phone handset. Optionally, the collage can include clip art and/or photographic images (or portions thereof) in addition to the panoramic image. FIGS. 4 and 5 depict exemplary user interfaces 400 and 500 respectively for collage production.

FIG. 4 is a schematic representation of exemplary user interface 400 for application of a graphic clip-art "sticker" to an image according to an exemplary embodiment of the invention.

According to depicted exemplary interface 400, display 416 concurrently presents panoramic image 460, and a library 420 of clip art stickers. In an exemplary embodiment of the invention, the user selects a clip art item (e.g. heart 422) using navigation device 110. Referring now to the second panel of FIG. 4, the user positions a cursor 430 at a desired location in image 460 using navigation device 110. Optionally, a current direction of motion of cursor 430 is indicated by direction indicator 432. In an exemplary embodiment of the invention, the user issues an "apply sticker command" when cursor 430 is positioned at a desired location in image 460. As depicted in the right hand panel, the selected clip-art (e.g. heart 422) is applied to image 460 as a sticker in response to the command. Optionally, the command is issued using one of auxiliary keys 114.

FIG. 5 is a schematic representation of exemplary user interface 500 for blending of an additional photographic image from a series of stored images to a panoramic image according to an exemplary embodiment of the invention.

According to depicted exemplary interface 500, display 516 concurrently presents panoramic image 560, and a library 520 of photographic images (e.g. 522, 524 and 526). In an exemplary embodiment of the invention, the user selects a photographic image (e.g. 524) using navigation device 110. Optionally, a selection direction within library 520 is indicated by direction indicator 528. Referring now to the second panel of FIG. 5, the user positions a cursor 530 at a desired location in image 560 using navigation device 110. In an exemplary embodiment of the invention, automating sensing of CaMo is used for cursor manipulation.

Optionally, a current direction of motion of cursor 530 is indicated by direction indicator 532. In an exemplary embodiment of the invention, the user issues a "blend photo" command when cursor 530 is positioned at a desired location in image 560. As depicted in the right hand panel, selected photograph 524 is blended to image 560 in response to the command. Optionally, the command is issued using one of auxiliary keys 114. According to exemplary embodiments of the invention, applied image 524 can be opaque or partially transparent. Optionally, applied image 524 is opaque at its center and becomes progressively more transparent towards its edges. In an exemplary embodiment of the invention, the progression towards transparency contributes to a blending effect of applied image 524 with background image 560.

Exemplary Overlay Alignment

In an exemplary embodiment of the invention, a user interface provides an overlaid portion of a second image for alignment with a portion of a first image. In some embodiments, overlay alignment contributes to a smooth transition between frames of a panoramic image by helping the user achieve a good initial alignment. In an exemplary embodiment of the invention, a first image is presented in a viewing frame.

Optionally, the first image is a current "viewfinder" image which has not yet been acquired. Typically, the viewfinder image resides in a temporary storage buffer, sometimes at a lower resolution than "acquired" frames stored in memory. A second image (e.g. a last acquired frame in a panoramic image) can then be overlaid in a portion of the viewing frame. Optionally, the overlaid image is blended with the current viewfinder image. In an exemplary embodiment of the invention, blending of the overlaid image with the current viewfinder image produces a new "second image" which can be overlaid on a portion of a viewfinder image as panning continues. In this way, the user can piece together the panorama during frame acquisition.

Optionally, the user selects a portion of the second image to be overlaid. In an exemplary embodiment of the invention, 30-60% overlay aids the user in seeking a correct alignment. Optionally, an increase in overlay percentage contributes to ease of user managed alignment. In an exemplary embodiment of the invention, the user manipulates the first image with respect to the second overlaid image by moving the camera until a desired alignment is achieved. Optionally, the user or the camera determines when desired alignment is achieved, for example by pixel matching. Optionally, a first image comprising a viewfinder image is automatically acquired when the desired alignment is achieved. In an exemplary embodiment of the invention, stitching engine 162 adjusts the desired alignment of two images in memory automatically. In many exemplary embodiments of the invention, automatic alignment by stitching engine 162 supplements and/or completes a preliminary alignment performed by the user.

In some exemplary embodiments of the invention, a portion of the viewfinder displays a previously acquired portion of a panoramic image and the user employs overlay alignment to indicate a desired spatial relationship between the new frame and the existing portion panoramic image.

In some exemplary embodiments of the invention, the user constructs a panoramic image using overlay alignment of frames that were not originally acquired in a panoramic mode, or belong to separate panoramas.

Exemplary Image Inversion

Figure 6:
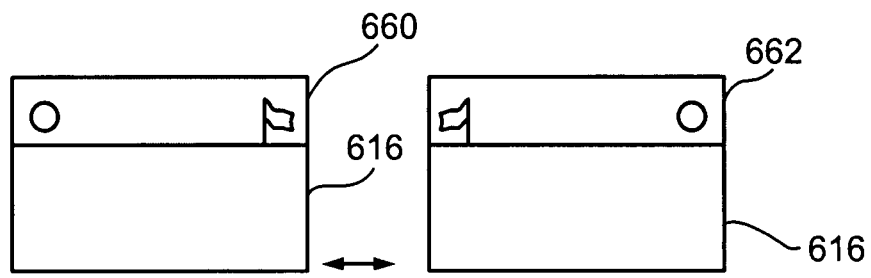
FIG. 6 is a schematic representation of inversion of an image according to an exemplary embodiment of the invention.

FIG. 6 is a schematic representation of a user interface 600 for inversion of an image according to an exemplary embodiment of the invention. In the depicted embodiment a panoramic image 660 is presented on a display screen 616. In an exemplary embodiment of the invention, the user selects "invert" from a menu and a mirror image panorama 662 is presented on display 616. While horizontal inversion is depicted, vertical inversion is also within the scope of the invention. Optionally, inversion can be performed to allow incorporation of additional frames acquired from a different angle.

Exemplary Panoramic Template

In an exemplary embodiment of the invention, a panoramic image is presented in a template on a display of a mobile telephone handset.

Figure 7:
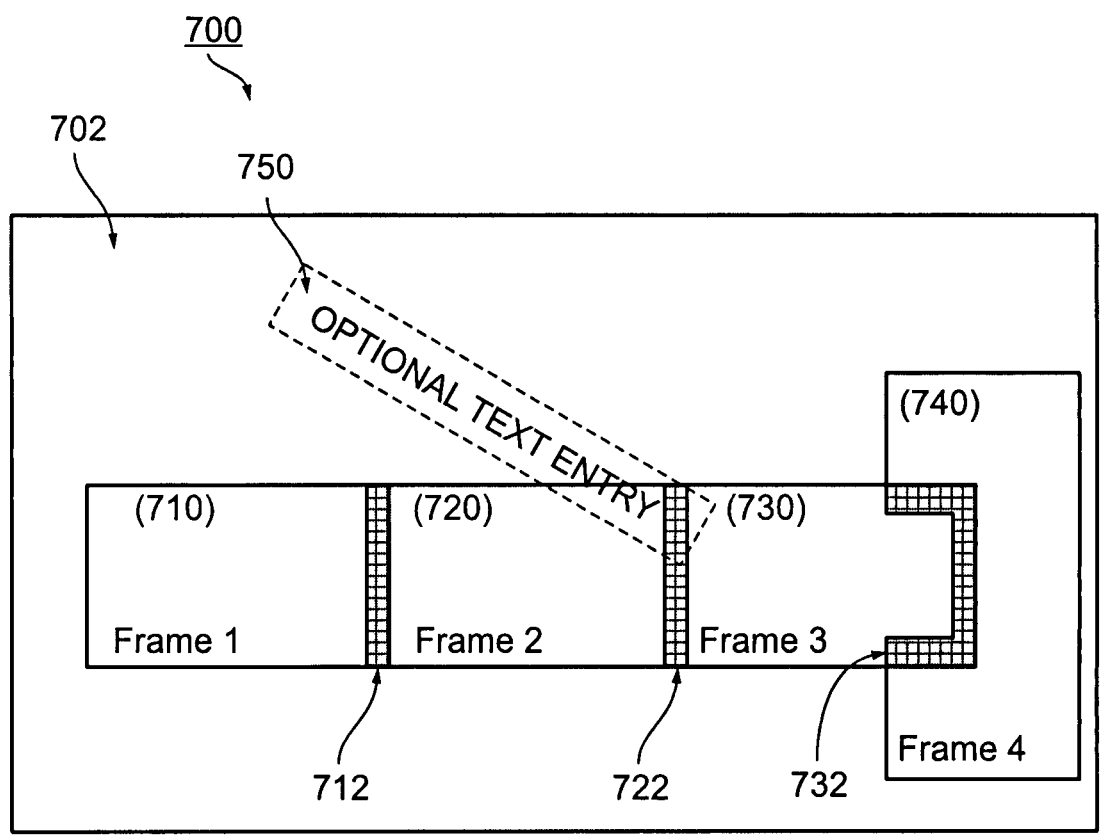
FIG. 7 is a schematic representation of a panoramic mosaic template according to an exemplary embodiment of the invention.

FIG. 7 is a schematic representation of a template 700 according to an exemplary embodiment of the invention. In the depicted template 700, a background area 702 contains placeholders 710, 720 and 730 for frames 1, 2 and 3 of a panoramic image respectively. Optionally, the user places previously acquired frames into placeholders 710, 720 and 730 without stitching the frames together in a standard panorama. Optionally, an additional frame in a different orientation from the panorama is placed in an additional placeholder 740.

In an exemplary embodiment of the invention, frame separators 712, 722 and 732 are provided between the placeholders to create a mosaic effect. In an exemplary embodiment of the invention, the frame separators serve to at least partially mask an imperfect alignment between adjacent frames.

In an exemplary embodiment of the invention, template 700 includes at least one text box 750 for optional text entry. Optionally, the user can format text using fonts and/or styles (e.g. italics, underline or bold) and/or effects (e.g. shadows, 3D or animation effects).

In an exemplary embodiment of the invention, the user can select a color and/or texture and/or fill effect (e.g. gradient, recessed and/or superimposed) and/or theme for background area 702. Optionally, separators 712, 722 and 732 are treated as part of the background area in terms of color and/or texture and/or fill effect.

Optionally, background 702 and/or separators 712, 722 and 732 are recessed with respect to the panoramic image so that the image casts a shadow on the background and/or separators.

Optionally, background 702 and/or separators 712, 722 and 732 are superimposed with respect to the panoramic image so that the background and/or separators cast a shadow on the image.

In an exemplary embodiment of the invention, a user assembles a series of frames which do not form a panorama into placeholders 710, 720 and 730 (and optionally 740). Optionally, the frames are thematically related (e.g. all pictures from a single location) but are not perceptibly spatially aligned as frames in a conventional panoramic image are. For Example, a visitor at an Alpine chalet might assemble frames comprising a view of a valley from the front porch, a view of a facade of the chalet and a self portrait with the valley in the background into placeholders 710, 720 and 730 to create a theme-o-rama of a visit.

Exemplary Virtual 3D Projection

Figure 8:
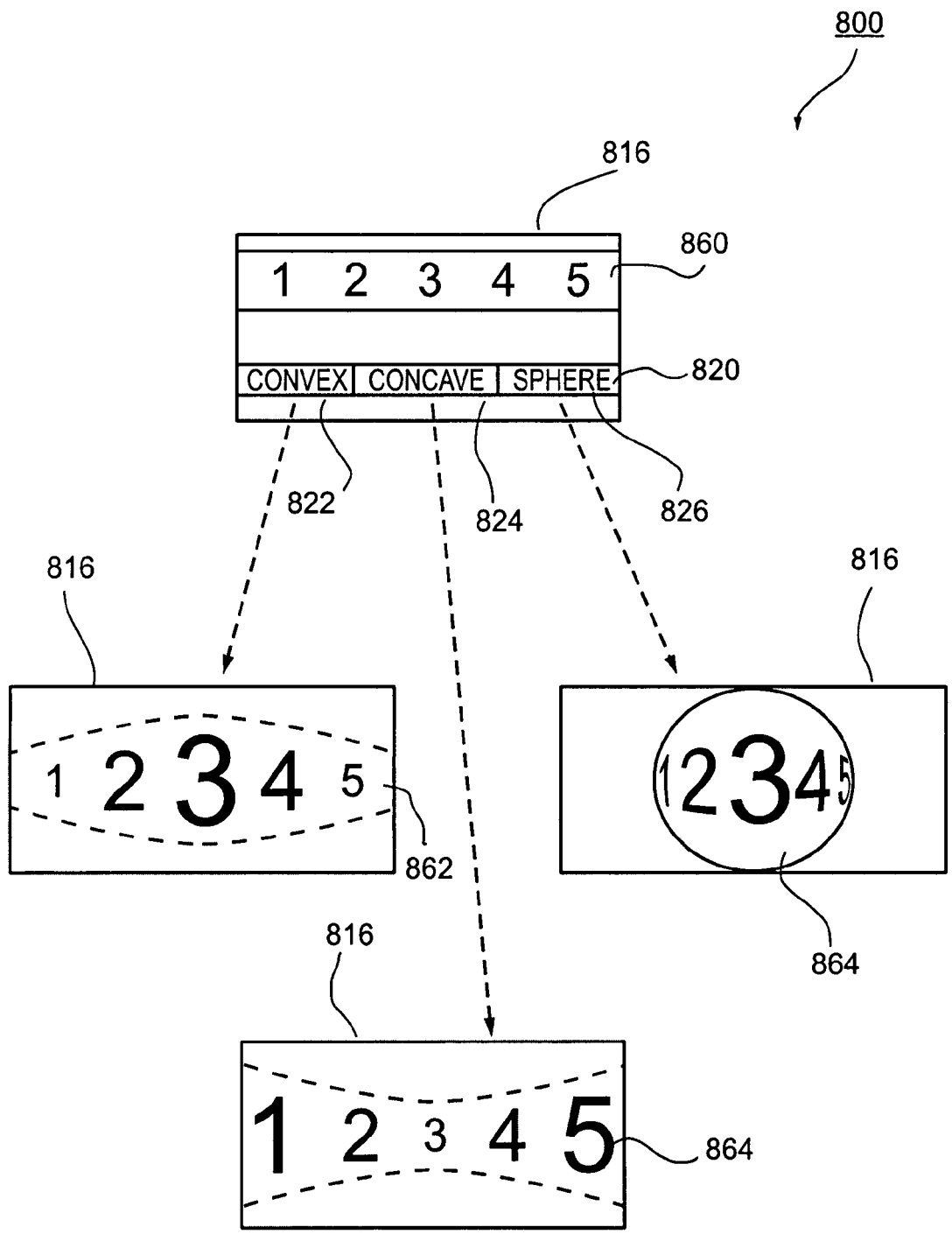
FIG. 8 is a schematic representation of an exemplary virtual 3D projection interface and exemplary 3D projection outputs.

FIG. 8 is a schematic representation of an exemplary user interface 800 for virtual 3D projection interface with exemplary 3D projection outputs of panoramic images depicted below.

The upper portion of FIG. 8 shows a panoramic image 860 on a display screen 816 of mobile handset 100. In order to emphasize the effect of projection on different types of 3D surfaces, image 860, includes the numeral 1 through 5 in a uniform size arranged from left to right. Optionally, menu 820 presents a list of 3D projection surfaces. In the depicted exemplary embodiment menu 820 contains three choices: convex (822), concave (824) and sphere (826). Selection of a 3D surface from menu 820 can be via navigation device 110 as described above.

The three 3D surfaces depicted are exemplary only and projection on any surface (e.g. face) or solid (e.g. cube) is possible. Optionally, a library of 3D surfaces for projection of panoramic images thereupon is available on a remote server and users can download different surfaces to their handsets for projection.

The lower portion of FIG. 8 shows exemplary 3D projection outputs resulting from selection of convex (822), concave (824) and sphere (826) respectively.

Selection of convex projection surface 822 from menu 820 produces modified panoramic image 862. In image 862, a central portion (represented by the numeral 3) is modified relative to a corresponding area of source image 860 using a relevant 3D projection formula. End portions of modified image 862 (represented by the numerals 1 and 5) are modified relative to a corresponding area of source image 860 according to the same projection algorithm. Intervening portions of image 862 (represented by numerals 2 and 4) are less modified relative to corresponding areas of source image 860. Optionally, the original panoramic image (before projection) and/or the projected image can be stored in memory of the handset and/or transmitted to another device (e.g. an additional mobile phone handset).

Selection of concave projection surface 824 from menu 820 produces modified panoramic image 864. In image 864, a central portion (represented by the numeral 3) is modified relative to a corresponding area of source image 860 using a relevant 3D projection algorithm. End portions of modified image 864 (represented by the numerals 1 and 5) are modified relative to a corresponding area of source image 860 in a different way according to the same algorithm. Intervening portions of image 864 (represented by numerals 2 and 4) are modified to a lesser degree relative to corresponding areas of source image 860.

Selection of spherical projection surface 826 from menu 820 produces modified panoramic image 866. In image 866, a central portion (represented by the numeral 3) is modified relative to a corresponding area of source image 860 to a greater degree than in modified image 862 using a relevant 3D projection formula. End portions of modified image 866 (represented by the numerals 1 and 5) are modified relative to a corresponding area of source image 860 to a greater degree than in modified image 862. In addition, modified image 866 is subject to widthwise compression with the greater compression occurring at the ends (represented by numerals 1 and 5).

In an exemplary embodiment of the invention, 3D projection contributes to a more realistic appearance of a panoramic image. Optionally, the user can change the projection angle (e.g. by moving the camera) to simulate turning their head in an actual scene. In an exemplary embodiment of the invention, only a portion of the panoramic image is presented on the display screen and the viewer can change the presented portion by changing the selected projection angle. Optionally, changing the presented portion by changing the selected projection angle simulates a real-world feeling. Optionally, a degree of curvature and/or regularity of curvature are adjustable by the user. Optionally, the user can zoom in and out of the projected image.

Exemplary Panoramic Matrices

In examples set forth hereinabove, the term "panoramic image" has indicated a linear series of frames assembled end-to-end (or corner-to-corner) to produce a panorama. In an exemplary embodiment of the invention, an image which is panoramic in two orthogonal dimensions is produced by acquiring a series of frames arranged in a matrix. An exemplary 3×3 matrix is presented here although larger matrices and/or matrices which are larger in one orthogonal direction than in a second orthogonal direction are within the scope of the invention. The number of image frames in a matrix is typically influenced by interplay between image resolution, available memory, available computing capacity and sensitivity of CaMo engine 164 or accelerometer. Alignment of a next frame with a preceding frame is optionally according to user interfaces described hereinabove.

Although frames are depicted as squares in the examples set forth hereinbelow, each frame can have any H:W aspect ratio. In an exemplary embodiment of the invention, CaMo engine 164 is programmed to consider an aspect ratio of each frame. Optionally, aspect ratio and/or panning direction are considered by CaMo engine 164 when deciding when to acquire a next frame.

FIGS. 9a; 9b; 9c and 9d represent schematically different exemplary sequences for acquisition of frames in an exemplary 3×3 panoramic matrix.

FIG. 9a depicts an exemplary acquisition sequence 900 in which the user begins at the corner (top left in this example) of a desired image area. After acquiring frame 1, the user pans in a first direction (right in this example) to acquire frame 2 and continues to pan to acquire frame 3. After acquisition of frame 3, the user pans back (left in this example) until frame 1 is visible again, and then pans down to capture frame 4. The user then pans in the first direction again (right in this example) to capture frames 5 and 6. After acquisition of frame 6, the user pans back (left in this example) until frame 4 is visible again, and then pans down to capture frame 7. The user then pans right to capture frames 8 and 9 and the matrix is complete. Leftward panning from frame 3 back to frame 1 and from frame 6 back to frame 4 can be perceived as a disadvantage by the user.

FIG. 9b depicts an exemplary acquisition sequence 902 in which the user begins at the center of a desired image area. After acquiring frame 1, the user pans in a first direction (right in this example) and acquires frame 2. The user then pans in a direction perpendicular to the first direction (up in this example) and acquire frame 3. The user then pans in a direction opposite to the first direction (left in this example) and acquires frames 4 and 5. The user then pans in a direction opposite to the second direction (down in this example) and acquires frames 6 and 7. The user then resumes panning in the first direction and acquires frames 8 and 9. This exemplary acquisition sequence eliminates panning back through previously acquired frames although it includes 4 changes in panning direction.

FIG. 9c depicts an exemplary acquisition sequence 904 in which the user begins at the corner (top left in this example) of a desired image area. After acquiring frame 1, the user pans in a first direction (right in this example) to acquire frame 2 and continues to pan to acquire frame 3. After acquisition of frame 3, the user pans in a perpendicular direction (down in this example) to acquire frame 4 and then pans back (left in this example) to acquire frames 5 and 6. After acquisition of frame 6, the user pans in the perpendicular direction to acquire frame 7 and resumes panning in the first direction to acquire frames 8 and 9.

FIG. 9d depicts an exemplary acquisition sequence 900 in which the user begins at the corner (top left in this example) of a desired image area and acquires a last frame in the center of the image area. After acquiring frame 1, the user pans in a first direction (down in this example) to acquire frame 2 and continues to pan to acquire frame 3. After acquisition of frame 3, the user pans in a perpendicular direction (right in this example) to acquire frames 4 and 5 and then pans in an opposite direction (up in this example) to acquire frames 6 and 7. After acquisition of frame 7, the user pans back towards frame 1 (left in this example) to acquire frame 8 and resumes panning in the first direction to acquire frame 9.

In some exemplary embodiments of the invention, only a portion of a matrix is of interest. Referring again to FIG. 9c, optionally a user begins by acquiring frame 3, and then acquires frames 4, 5, 7, 8 and 9 to produce an image that approximates a triangle and is panoramic in two orthogonal directions. Alternatively (referring to FIG. 9d) a user begins by acquiring frame 1, then acquires frames 2, 3, 4 and 5 to produce an "L" shaped image that is panoramic in two orthogonal directions.

Exemplary Flat Projection of 3D Objects

In an exemplary embodiment of the invention, a flat panoramic image of a 3D surface is provided. For example, two or three or four sides of a building can be depicted as frames in a single flat panoramic image.

General

In an exemplary embodiment of the invention, hardware sensors (e.g. accelerometers) at least partially replace the functionality of CaMo engine 164.

In an exemplary embodiment of the invention, user perceptible "front end features" operate together with one or more "back end" features. Optionally, back end features are at least partially imperceptible, optionally substantially completely imperceptible to the user. In an exemplary embodiment of the invention, the user perceives improved image quality resulting from back end features. Optionally, operation of back-end features does not significantly adversely affect camera and/or handset function.

One exemplary back end feature employed in some embodiments of the invention comprises use of cumulative camera motion between two or more frames of a panoramic image as a guide for stitching. Optionally, cumulative camera motion provides an initial alignment for stitching and a stitching algorithm makes fine adjustments in alignment based upon analysis of pixels in proximity to the stitch line suggested by accumulated CaMo.

Another exemplary back end feature employed in some embodiments of the invention comprises automated image capture by the camera when the CaMo engine feels that a suitable next frame for a panoramic image is in view. Optionally, an initial capture of a next frame is at a low resolution and/or includes some defect (e.g. motion, or blur). In an exemplary embodiment of the invention, if the user keeps the same next frame in view, the camera automatically acquires one or more additional images. Optionally, when a panoramic image is being assembled, a "best image" for each frame is selected for inclusion in the panorama. According to various exemplary embodiments of the invention, selection of a best image is made based on one or more parametric measures of image quality. Parametric measures of image quality include, but are not limited to measures of sharpness, dynamic range, contrast, and white balance. Optionally, if bad parts are near edges, a degree of overlap can be changed to improve the assembled panoramic image.

Another exemplary back end feature employed in some embodiments of the invention comprises applying pre storage processing to frames of a panoramic image. In an exemplary embodiment of the invention, acquired frames are processed for one or more of projection simulation (e.g., cylindrical), intensity, color correction, and registration calculations prior to storage in memory. Optionally, processing is applied that makes the frames more similar to one another so that the assembled panorama will have a uniform appearance across a panoramic range. Optionally, preprocessing contributes to an increase in efficiency. In an exemplary embodiment of the invention, efficiency increases as preservation of data which might normally be lost during the "save to memory" process increases.

A variety of numerical indicators have been utilized in the above description. It should be understood that these numerical indicators could vary even further based upon a variety of engineering principles, materials, intended use and designs incorporated into the invention. Alternatively, or additionally, as available computing capacity and/or memory in mobile phone handsets become greater, numerical constraints described hereinabove may be loosened. Additionally, components and/or actions ascribed to exemplary embodiments of the invention and depicted as a single unit may be divided into subunits. Conversely, components and/or actions ascribed to exemplary embodiments of the invention and depicted as sub-units may be combined into a single unit with the described/depicted function.

Alternatively, or additionally, features used to describe a method can be used to characterize an apparatus and features used to describe an apparatus can be used to characterize a method.

Alternatively, or additionally, various methods described hereinabove can optionally be provided as software or firmware or integrated into mobile phone handset hardware.

It should be further understood that the individual features described hereinabove can be combined in all possible combinations and sub-combinations to produce exemplary embodiments of the invention. The examples given above are purely illustrative and are not intended to limit the scope of the invention which is defined solely by the following claims.

The terms "include", "comprise" and "have" and their conjugates as used herein mean "including but not necessarily limited to".

The terms "select", "selection", "choose" and "indicate" and their conjugates as used herein refer to selection from a menu containing icons and/or text as is commonly practiced in computerized interfaces.

The invention claimed is:

1. A method of assembling a panoramic image from a plurality of frames in a camera, the method comprising:
   (a) acquiring a video stream using a camera;
   (b) selecting an initial frame from the video stream for capture as a still image;
   (c) detecting a motion direction of the camera while the camera captures the video stream;
   (d) presenting at least one direction indicator comprising at least one of a border of a next frame or a center locator of a next frame, said next frame based on an analysis of at least one frame of said video stream according to the motion direction of said camera for guiding the user to move the camera to said border of said next frame or said center locator of said next frame in accordance with said at least one direction indicator in order to further select said next frame defining at least one additional frame from the video stream for capture as at least one other still image; and,
   (e) stitching the at least one additional frame to the selected initial frame in the camera to create a panoramic image.

2. A method according to claim 1, wherein the camera is installed in a mobile phone handset.

3. The method according to claim 1, wherein the further selecting includes overlay alignment.

4. The method according to claim 1, wherein the detection comprises detecting an absence of motion and triggers acquisition of an additional frame.

5. The method according to claim 1, wherein the selecting is performed manually by a user.

6. The method according to claim 1, comprising detection of at least one undesirable feature.

7. The method according to claim 6, wherein the undesirable feature comprises a face.

8. The method according to claim 1, wherein the further selecting is performed automatically by the camera.

9. The method according to claim 1, wherein the panoramic image is of a 3D surface.

10. The method of claim 1, wherein the still image and the at least one another still image have a higher resolution than the image resolution of the captured video stream.

11. The method of claim 1, wherein said generated at least one direction indicator is selected from the group consisting of: arrow indicator, frame indicator, next frame border indicator, next frame center indicator, blinking indicators, colored indicators, audible directions and combinations thereof.

12. A method of assembling a panoramic image using a camera, the method comprising:
    (a) initializing a process of acquiring a plurality of frames from a video stream for creating a panoramic image using the camera;
    (b) detecting a motion direction of the camera while the camera captures the plurality of frames from the video stream;
    (c) presenting at least one direction indicator in said video stream comprising at least one of a border of said next frame or a center locator of said next frame, said next frame based on an analysis of at least one previous frame of said video stream according to the motion direction of said camera;
    (d) interrupting the acquiring of the plurality of frames from the video stream according to the at least one direction indicator;
    (e) detecting a change in the motion direction of the camera while the camera captures the plurality of frames from the video stream;
    (f) resuming acquisition of the plurality of frames from the video stream belonging to the panoramic image according to the change; and,
    (g) assembling the acquired frames from the video stream to create the panoramic image.

13. The method according to claim 12, wherein the camera is installed in a mobile phone handset.

14. The method according to claim 12, further comprising: excluding from the panoramic image at least one frame of the plurality of frames, the at least one frame contains an interfering object.

15. The method according to claim 12, wherein the at least one frame not belonging to the panoramic image is acquired from a different position.

16. The method of claim 12, wherein said created panoramic image is a two dimensional panoramic image.

17. A camera adapted to assemble a panoramic image from a plurality of frames, the camera comprising:
    (a) a video acquisition module for providing a video stream;
    (b) a selector module adapted to select an initial frame from the video stream for capture as a still image, and to select a next frame from the video stream for capture as a still image;
    (c) a motion direction detector adapted to detect the motion direction of the camera while the camera captures the video stream, and to present at least one direction indicator in said video stream comprising at least one of a border of said next frame or a center locator of said next frame, said next frame based on an analysis of said initial frame of said video stream;
    (d) a user interface adapted to guide a user to move the camera in order to select said next frame from the video stream for capture as a still image according to said at least one direction indicator; and,
    (e) a stitching module adapted to stitch said next frame to the initial frame to create a panoramic image.

18. The camera according to claim 17, provided as part of a mobile phone handset.

19. A camera comprising circuitry adapted to assemble a panoramic image, the camera comprising:
    (a) a frame acquisition module for acquiring frames from a video stream;
    (b) a memory with plurality of frames stored therein, only some of the frames from the video stream and belonging to a panoramic image associated with the video stream;
    (c) a camera motion (CaMo) engine which detects a motion direction of the camera while the camera captures the video stream, and presents at least one direction indicator in said video stream comprising at least one of a border of a next frame or a center locator of a next frame, said next frame based on an analysis of at least one previous frame of said video stream according to the motion direction of said camera; and,
    (d) a stitching engine adapted to identify those frames in the memory which belong to the panoramic image according to the at least one direction indicator and assemble the identified frames from the video stream in sequence.

20. A camera according to claim 19, provided as part of a mobile phone handset.

* * * * *